United States Patent

Berkooz et al.

[11] Patent Number: 5,926,399
[45] Date of Patent: Jul. 20, 1999

[54] METHOD OF PREDICTING CHANGE IN SHAPE OF A SOLID STRUCTURE

[75] Inventors: Gal Berkooz, Ithaca, N.Y.; Richard W. Newsome, Indianapolis, Ind.

[73] Assignee: Beam Technologies, Inc., Ithaca, N.Y.

[21] Appl. No.: 08/808,316

[22] Filed: Feb. 28, 1997

Related U.S. Application Data

[60] Provisional application No. 60/012,720, Mar. 4, 1996.

[51] Int. Cl.$^6$ ........................................................ G06F 17/50
[52] U.S. Cl. ............................ 364/512; 364/578; 364/801
[58] Field of Search ...................... 364/512, 578, 364/801, 804, 474.24, 510; 395/500

[56] References Cited

U.S. PATENT DOCUMENTS 5,442,569 8/1995 Osano ...................................... 364/578

OTHER PUBLICATIONS

Tezduyar et al., "Parallel Finite–Element Computation of 3D Flows", IEEE, 1993, pp. 27–36.
Borggaard, J., and Burns, J., "A Sensitivity Equation Approach to Shape Optimization inFluid Flows," NASA CR 191598, also ICASE Report No. 94–8, Jan. 1994.
Vasta, V.N., Thomas, J.L., and Wedan, B.W., "Navier–Stokes Computatons of Prolate Spheroids at Angle of Attack," AIAA Paper 87–2627, 1987.
Burgreen, G.W. and Baysal, O., "Three Dimensional Aerodynamic Shape Optimization of Wings Using Sensitivity Analysis," AIAA Paper 94–0094. 1994.
Johnson, E.H., and Venkayya, V.B. "Automated Structural Optimization System (ASTROS) Volume, Theory Manual," AFWAL TR–88–3028, Dec. 1988.

*Primary Examiner*—Kevin J. Teska
*Assistant Examiner*—Thai Phan
*Attorney, Agent, or Firm*—Brown, Pinnisi & Michaels, PC

[57] ABSTRACT

A method is disclosed that enables the prediction of the equilibrium state of a structure upon which it force is applied by a fluid. In particular, the method is valid for cases where the force applied by the fluid causes a deformation in the structure so that the force on the structure changes as a result of the change in the flow pattern as a result of the structural deformation. The disclosed method is valid for cases where the flow exhibits shocks and separation of the flow and does not require an iteration between the flow and structures solution steps.

18 Claims, 28 Drawing Sheets

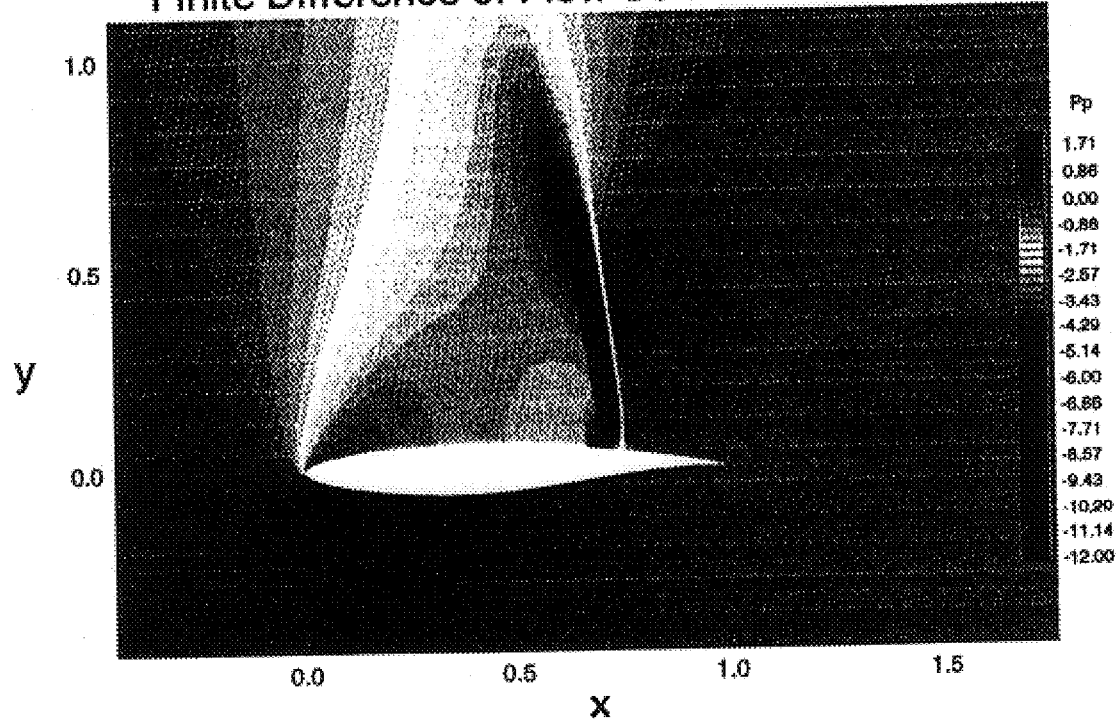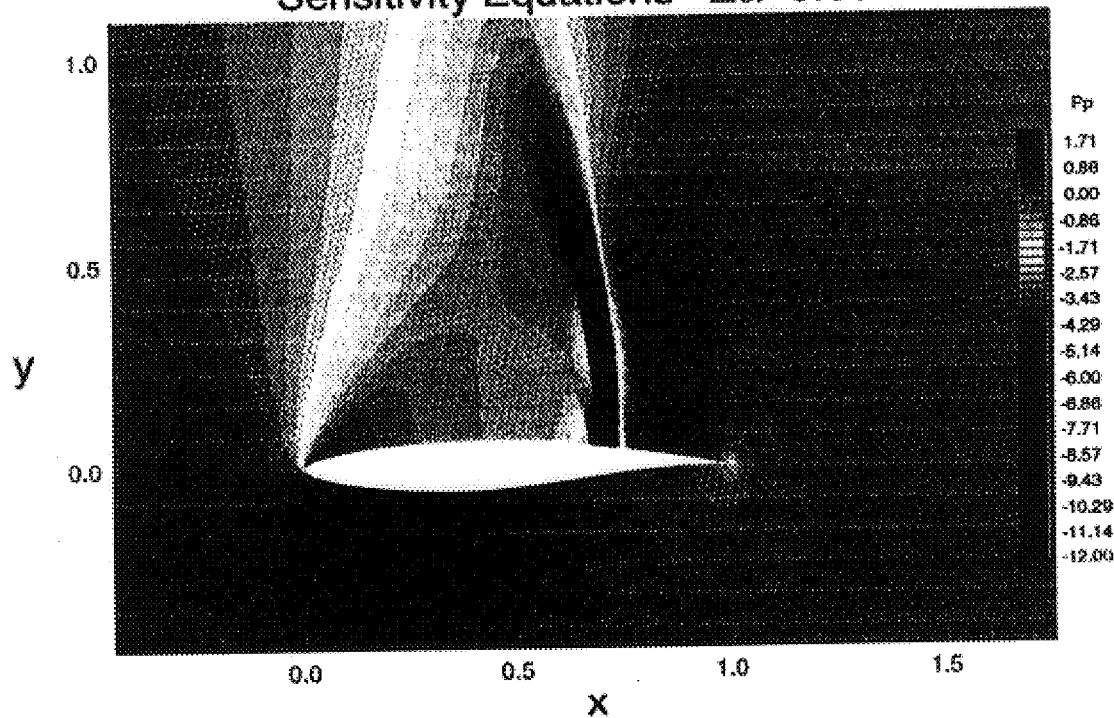
Fig 2. Comparison of Predicted Sensitivity wrt Angle of Attack
$M_\infty = 0.75$, $\alpha_{nom} = 2.72°$

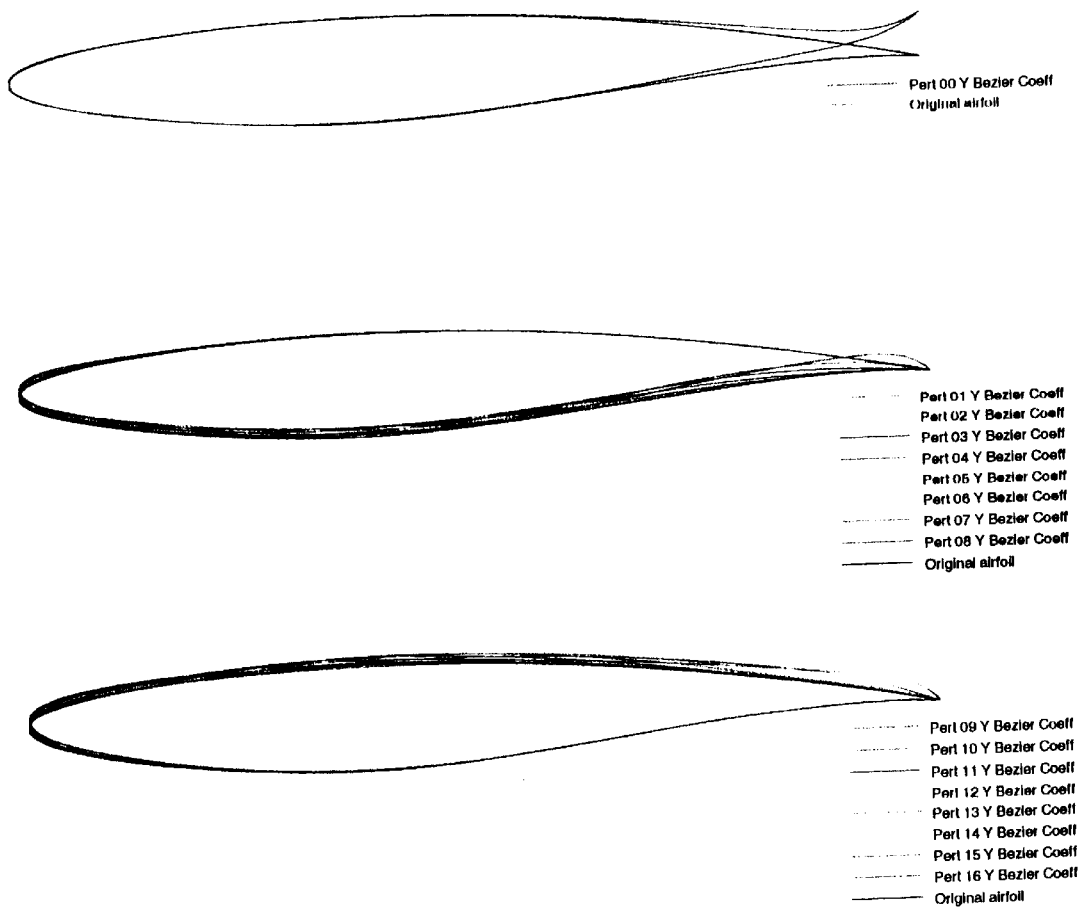
Fig. 3 Shape Change wrt Bezier Coeff Variation ($\Delta d_k=0.05$)
RAE 2822 airfoil

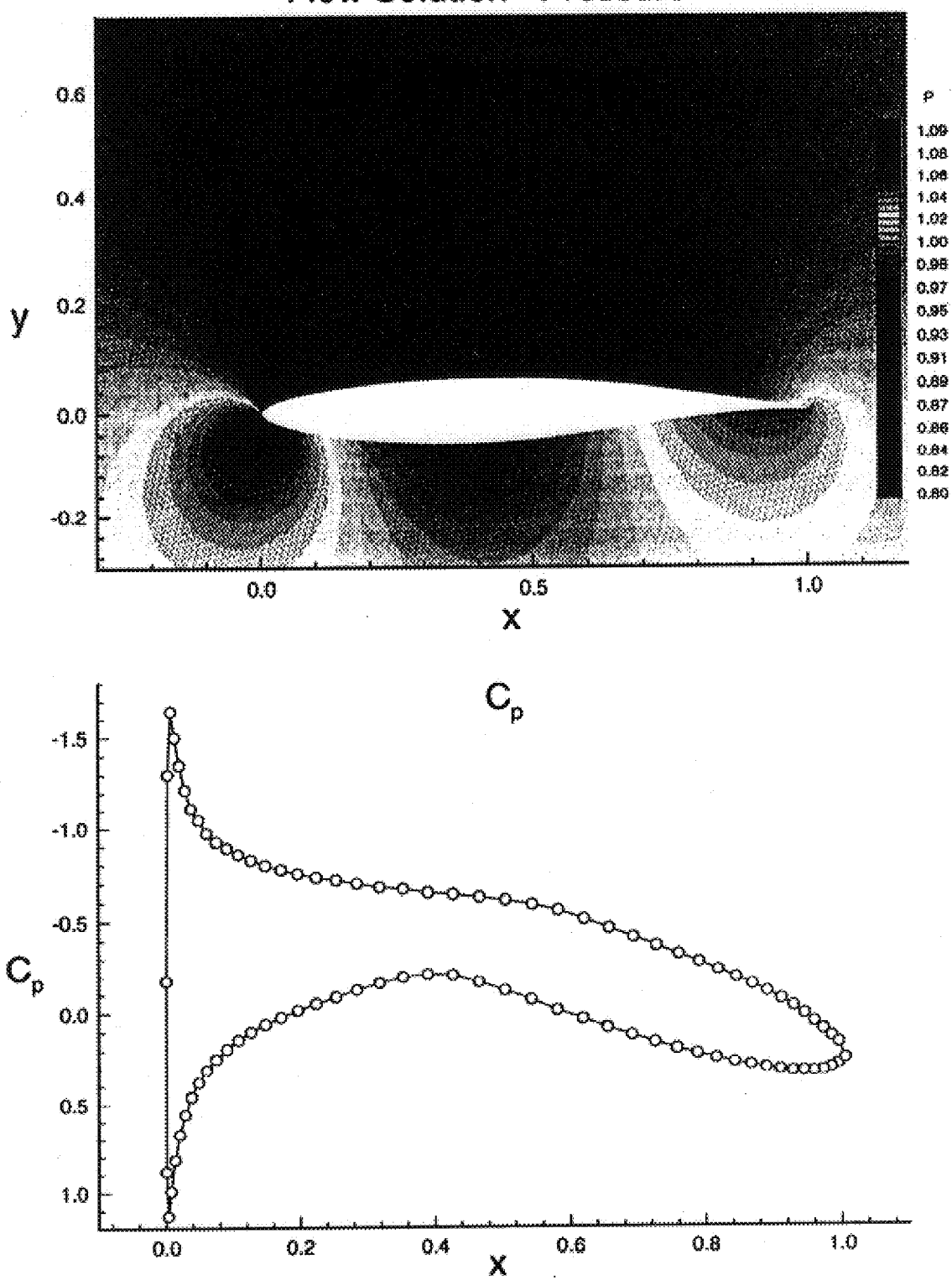
Fig. 4 Flow solution, RAE 2822 Wing Section
$M_\infty = 0.5$, $\alpha = 2.72°$

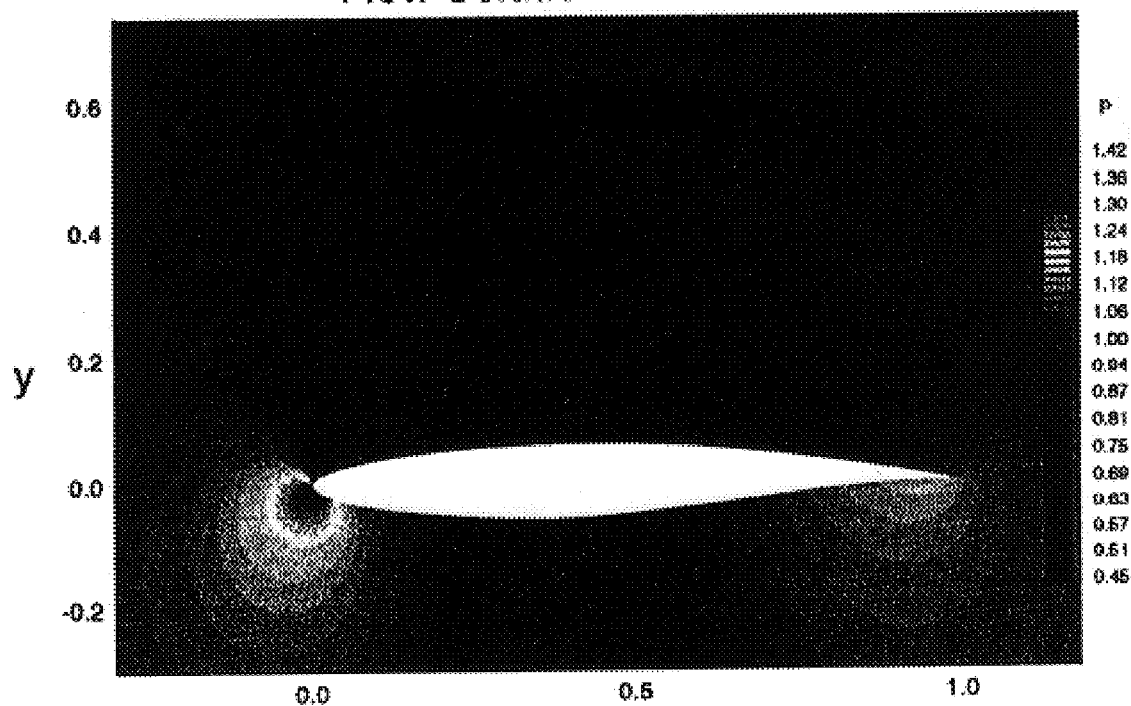
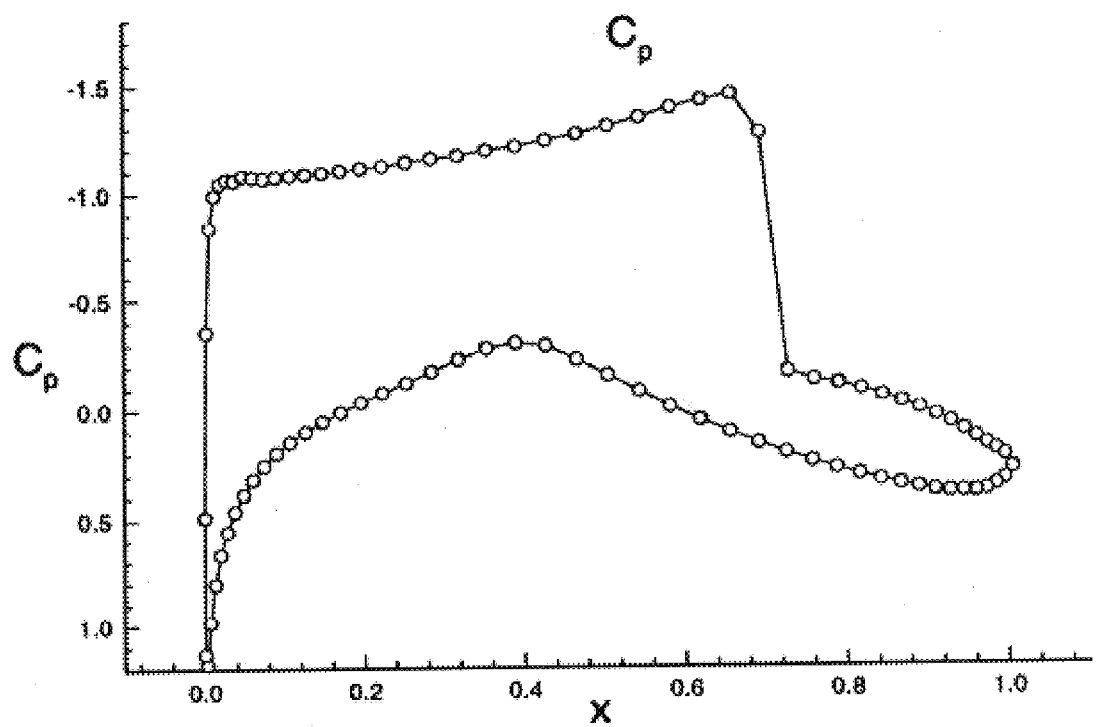
Fig. 5 Flow solution, RAE 2822 Wing Section
$M_\infty = 0.75$, $\alpha = 2.72°$

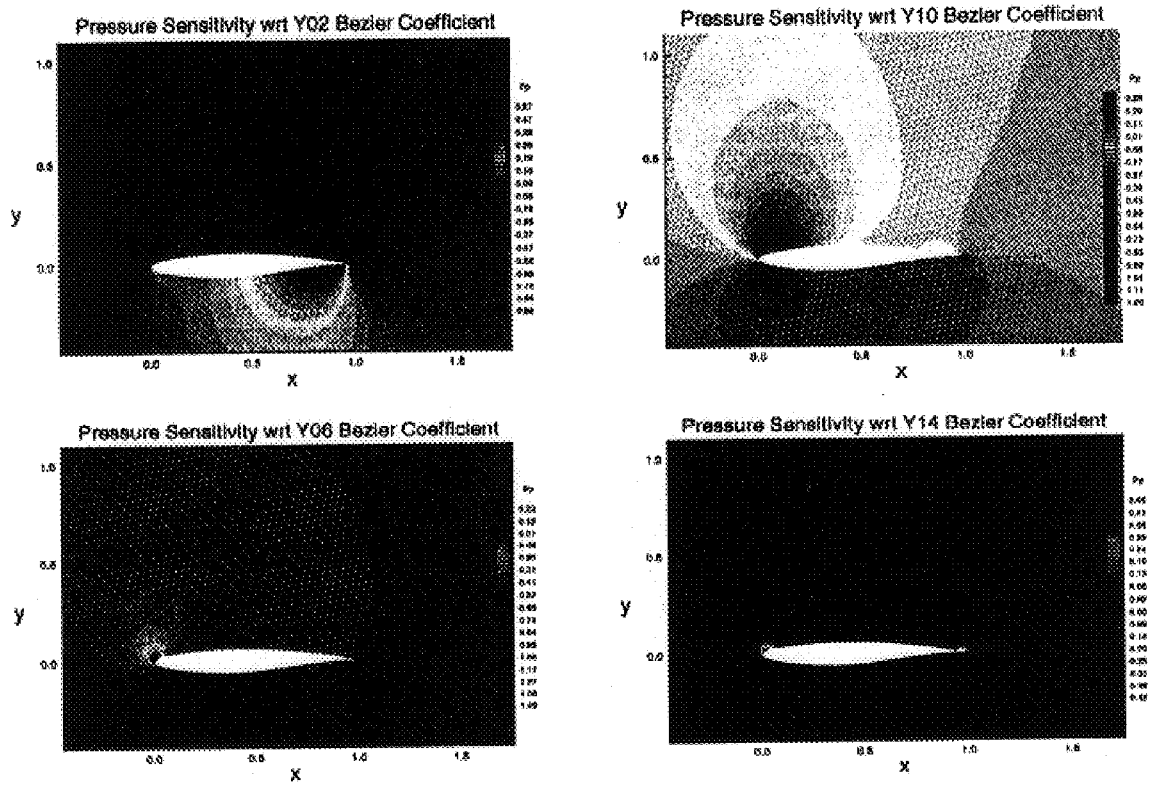
Fig. 6 Pressure Sensitivity wrt Selected y Bezier Coefficients
RAE 2822 Wing Section, $M_\infty = 0.5$, $\alpha = 2.72°$

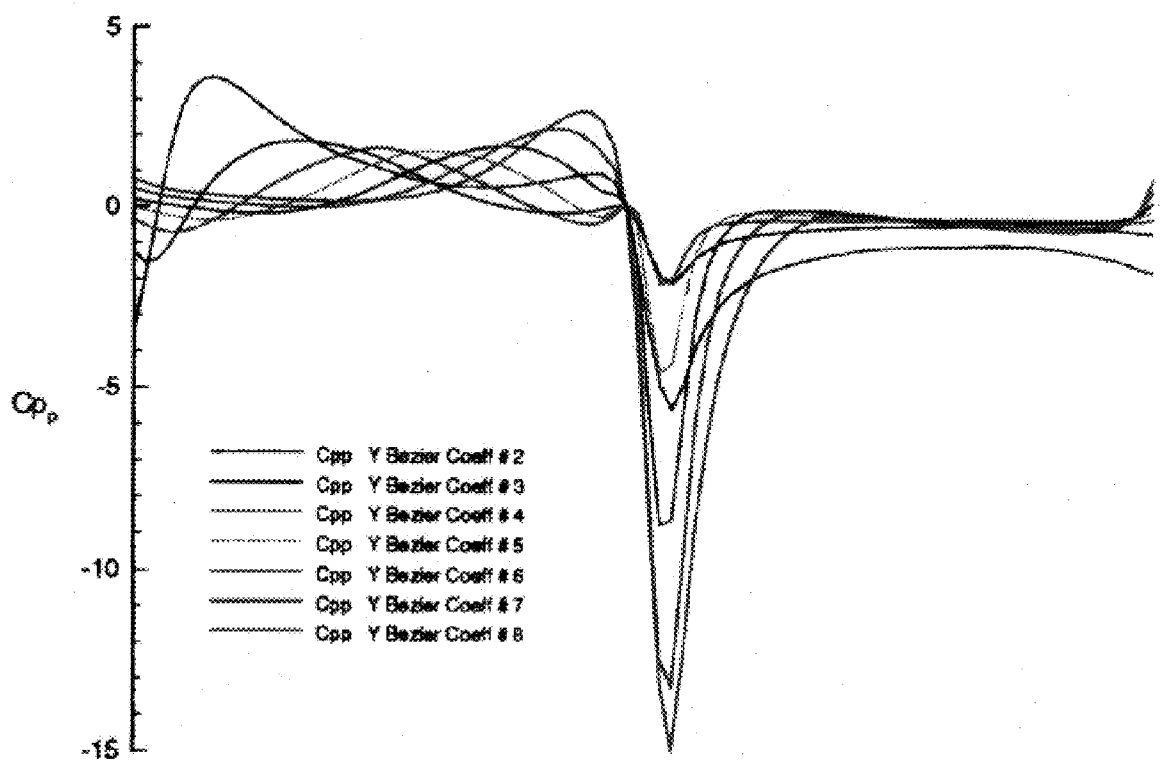

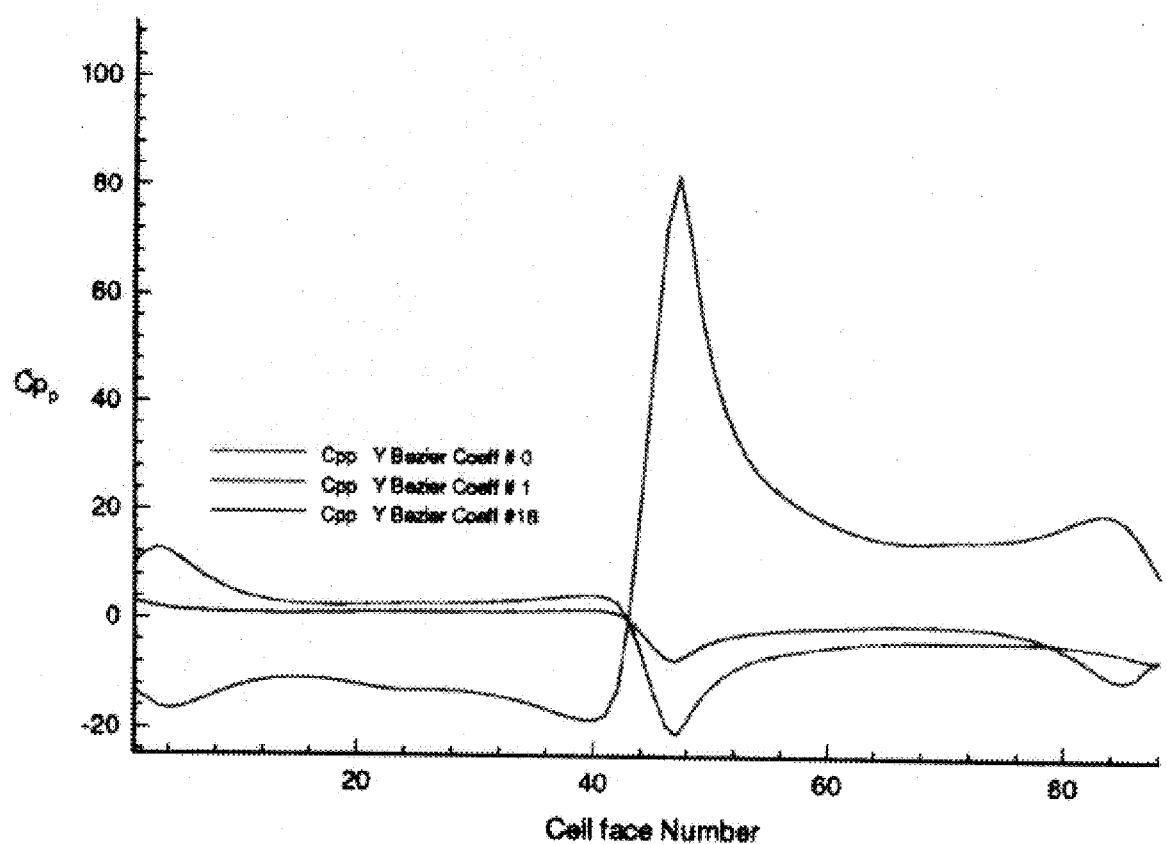

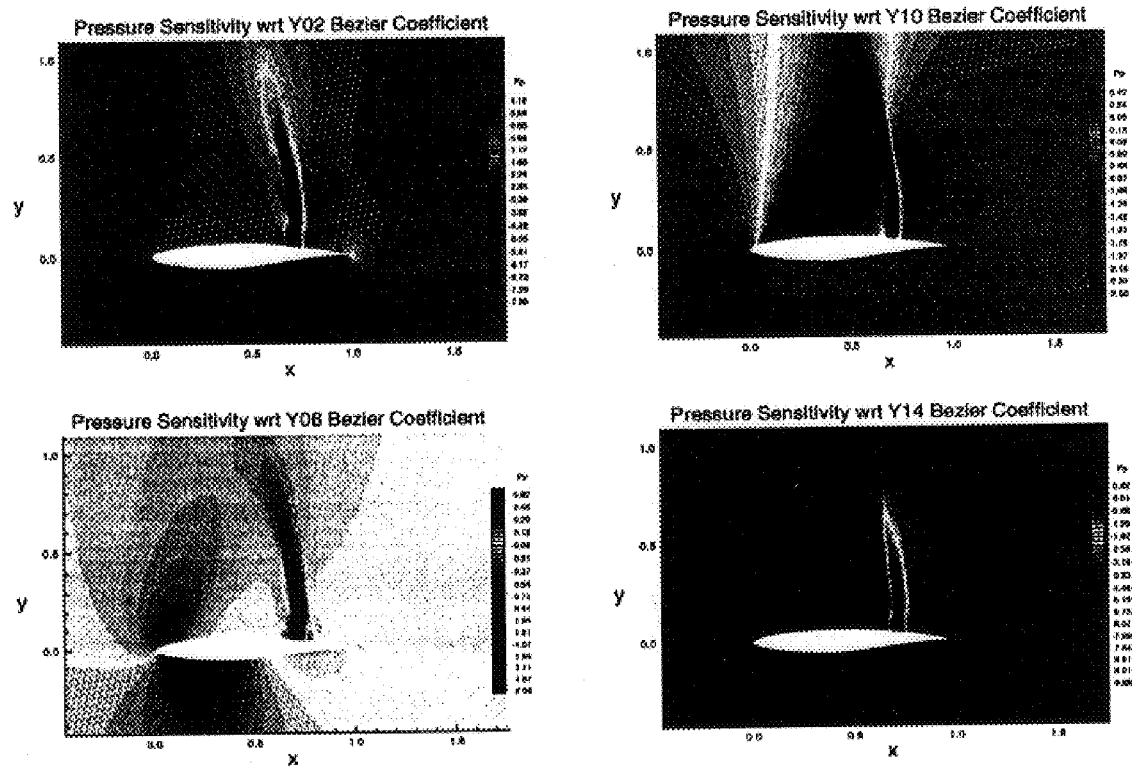
Fig. 8 Pressure Sensitivity wrt Selected y Bezier Coefficients
RAE 2822 Wing Section, $M_\infty = 0.75$, $\alpha = 2.72°$

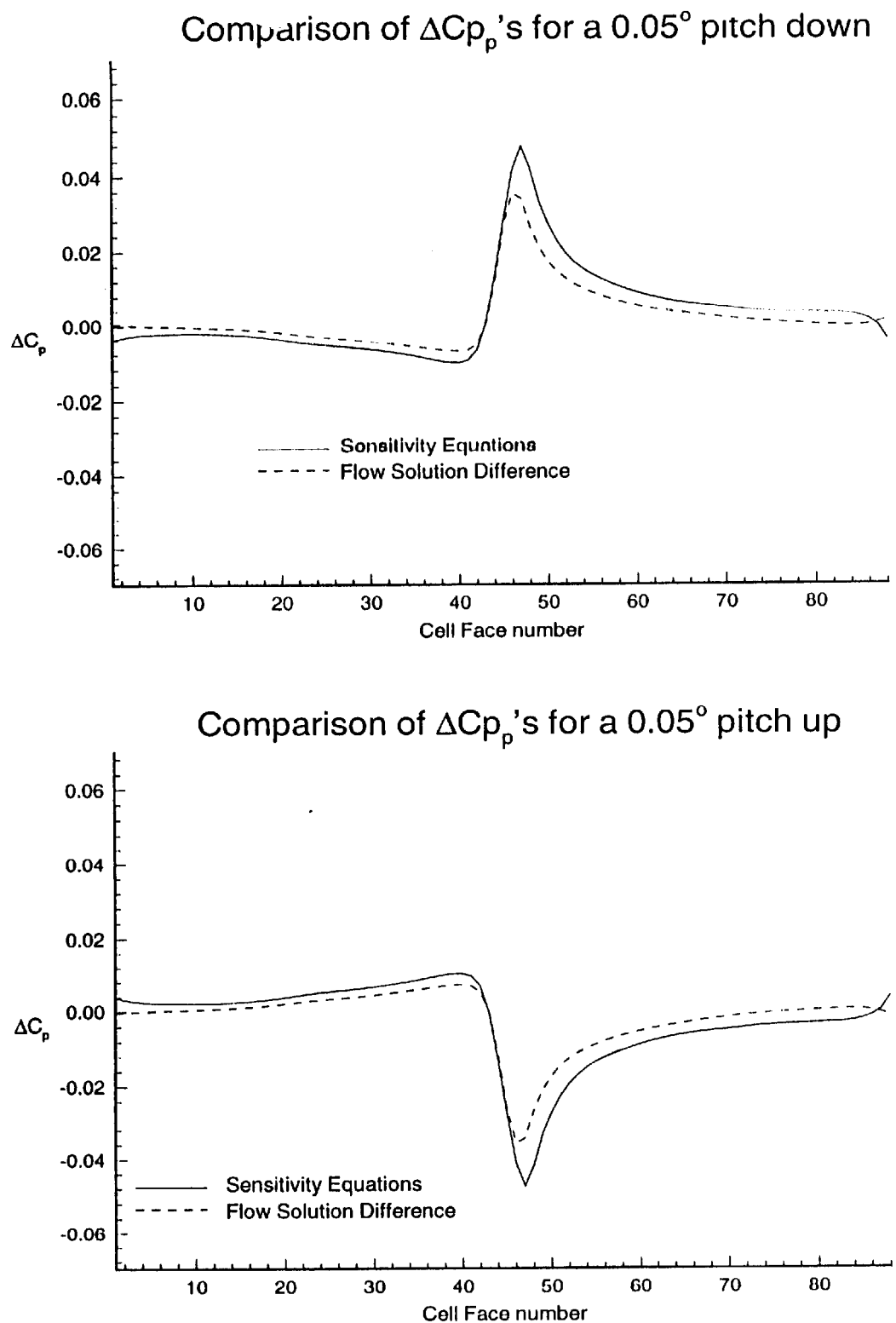
Fig. 10 ΔCp Comparison for RAE 2822 Wing Section
$M_\infty = 0.5$, $\alpha_{nom} = 2.72°$

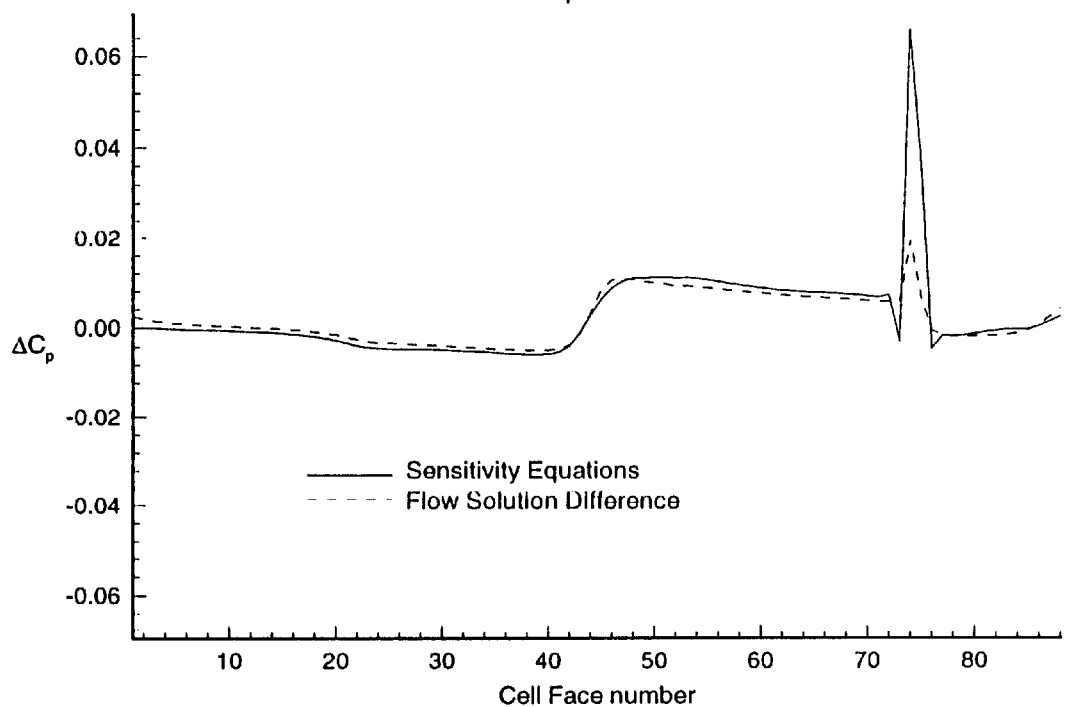
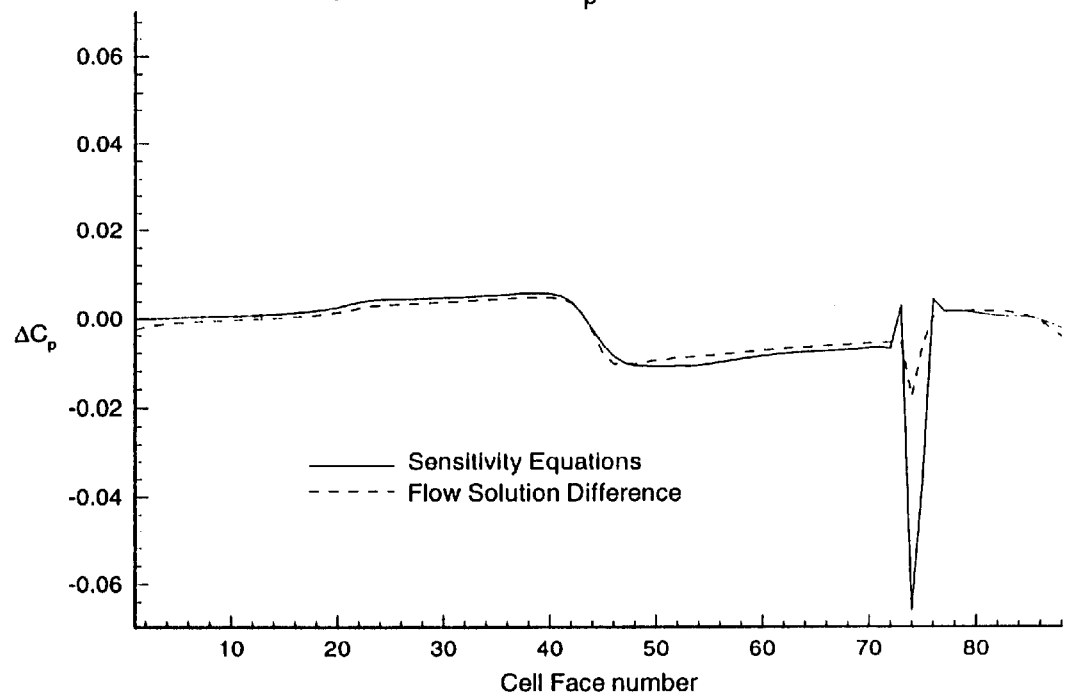
Fig. 11 ΔCp Comparison for RAE 2822 Wing Section
$M_\infty = 0.75$, $\alpha_{nom} = 2.72°$

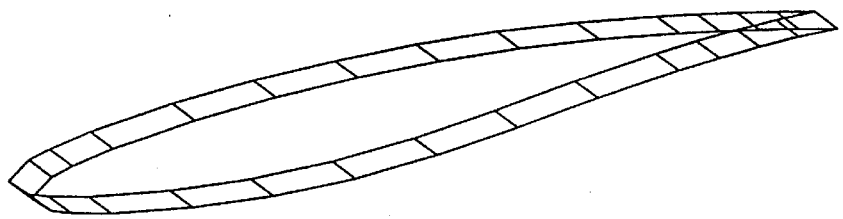
Structural Model
Upper/Lower Skins Represented with QUAD4 Elements
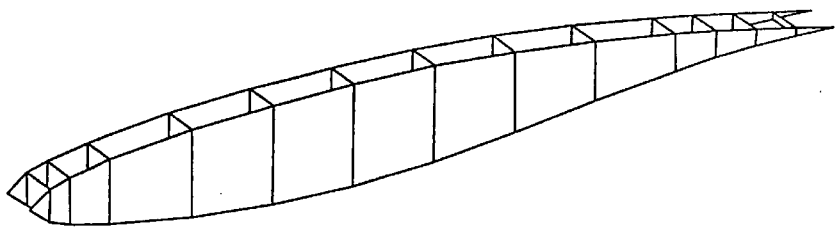
Structural Model
Understructure Webs Represented with SHEAR & TRIA3 Elements
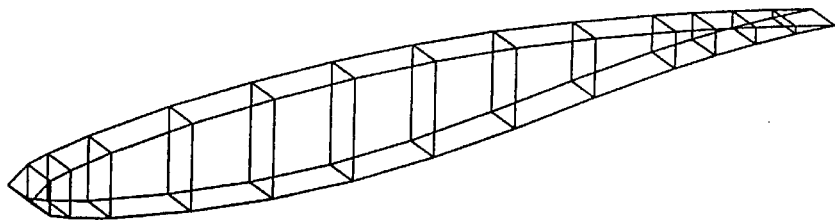
Structural Model
Spar/Rib Caps Represented with ROD Elements
Fig. 12 Structural Model Elements, RAE 2822 Wing Section

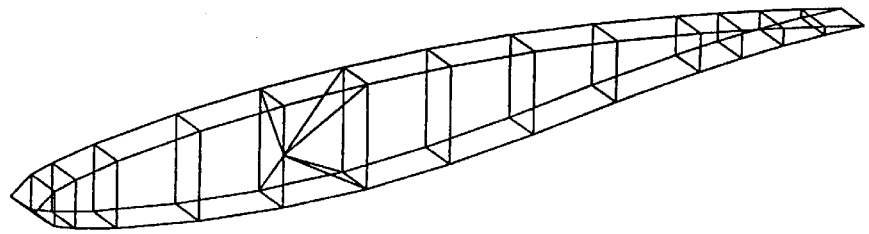
Structural Model
Wireframe View
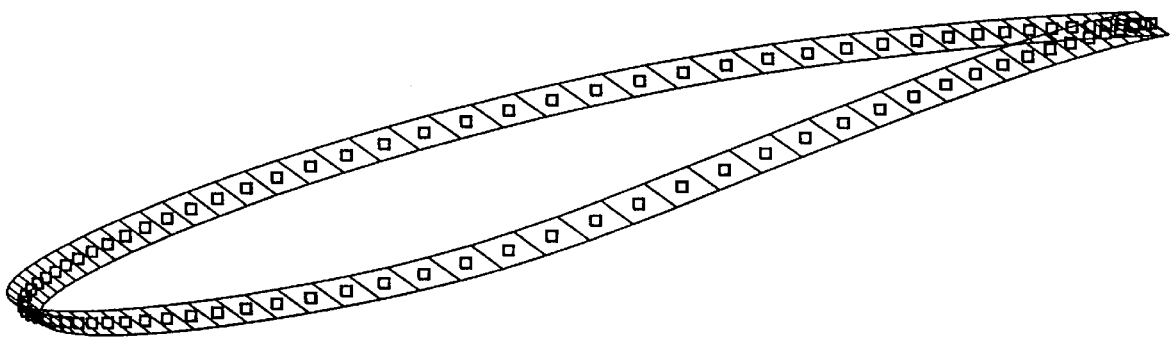
Aerodynamic Model
Control Points Depicted
Fig. 13 Structural Model, RAE 2822 Wing Section
Structural Wireframe, Aerodynamic Coordinates

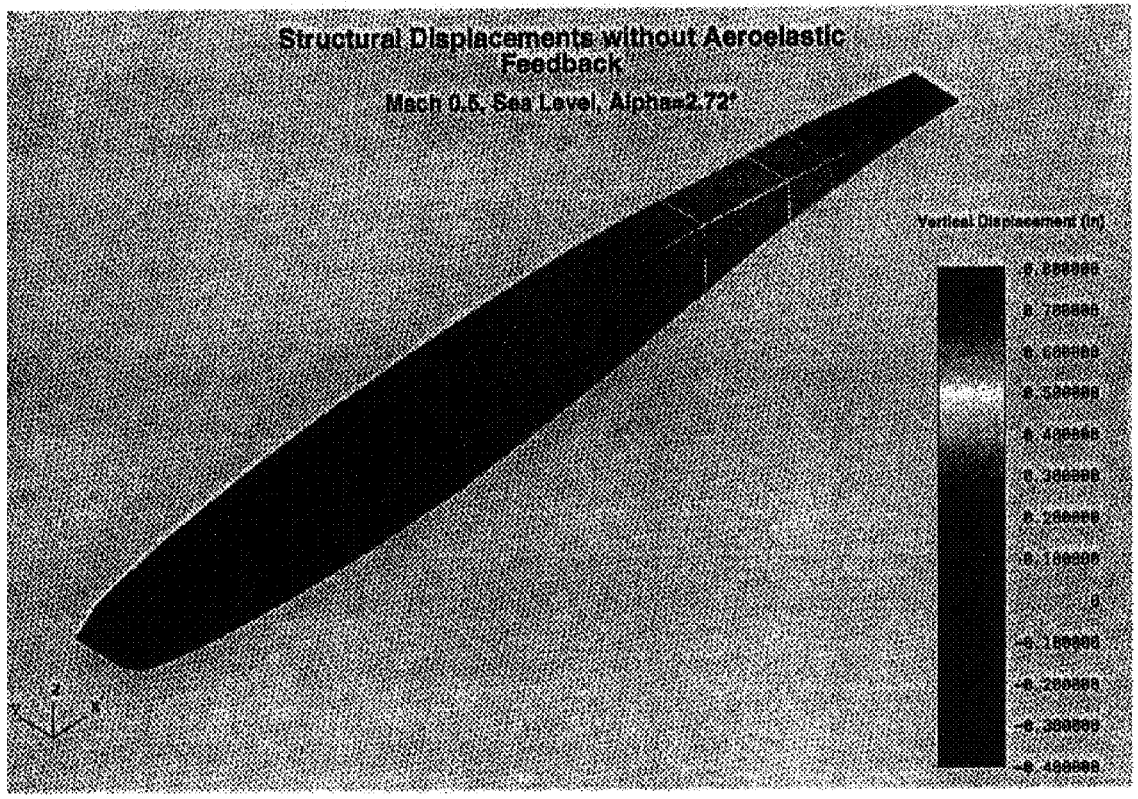
Fig. 14 ASTROS Static Aeroelastic Solution
RAE 2822 Wing Section, $M_\infty = 0.5$, $K_\theta = 0.5 \times 10^6$

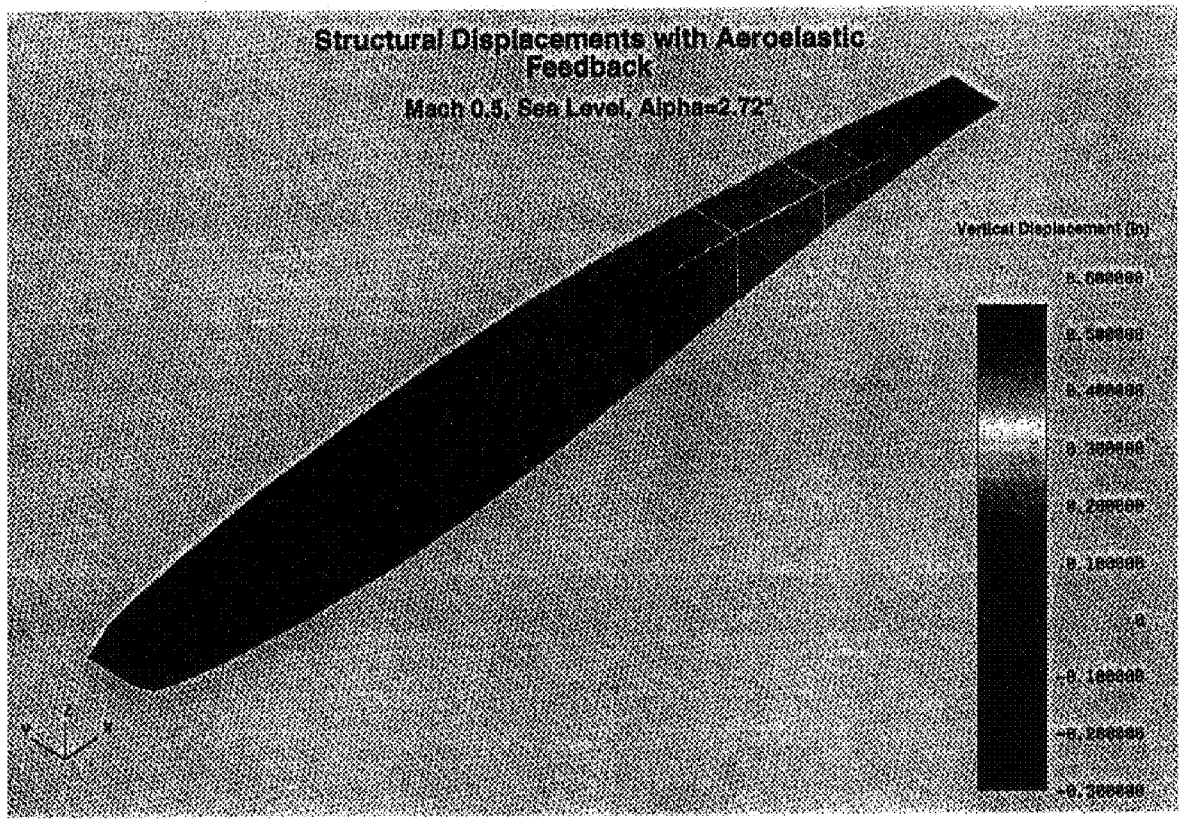
Fig. 15 ASTROS Static Aeroelastic Solution
RAE 2822 Wing Section, $M_\infty = 0.5$, $K_\theta = 0.5 \times 10^6$

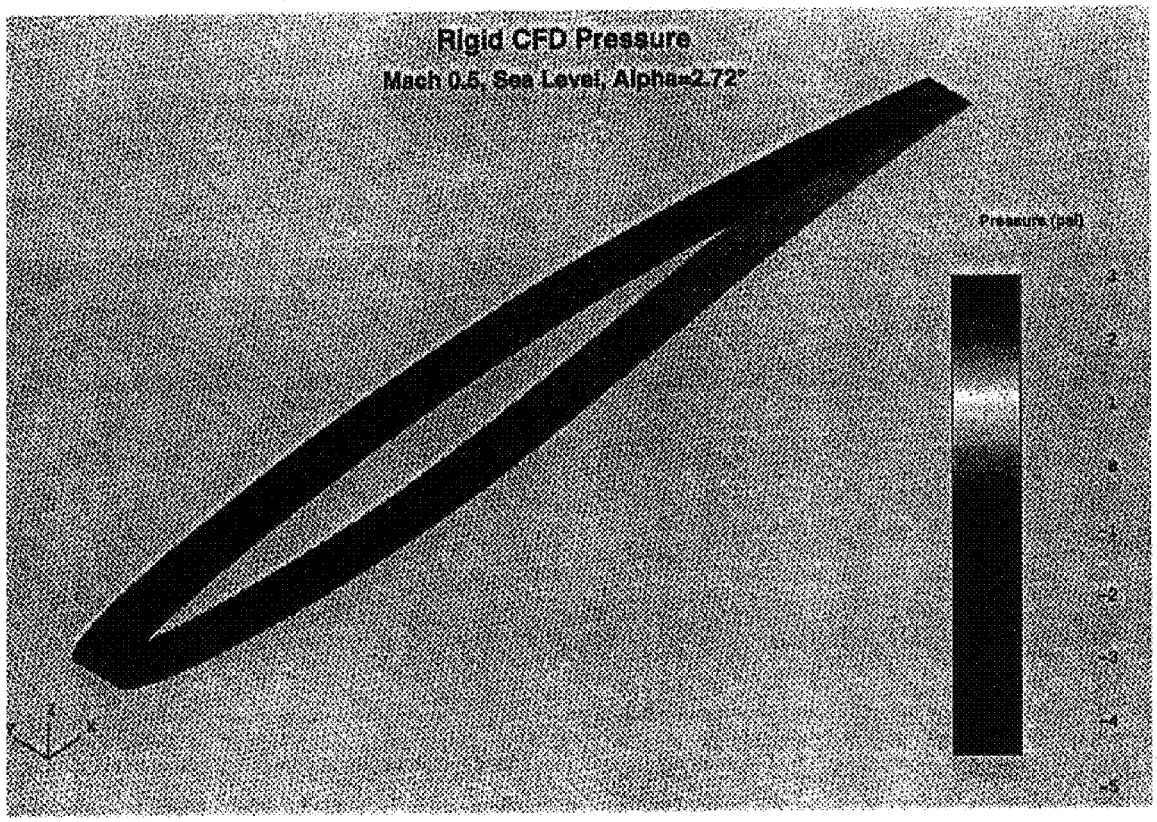
Fig. 16 ASTROS Static Aeroelastic Solution
RAE 2822 Wing Section, $M_\infty = 0.5$, $K_\theta = 0.5 \times 10^6$

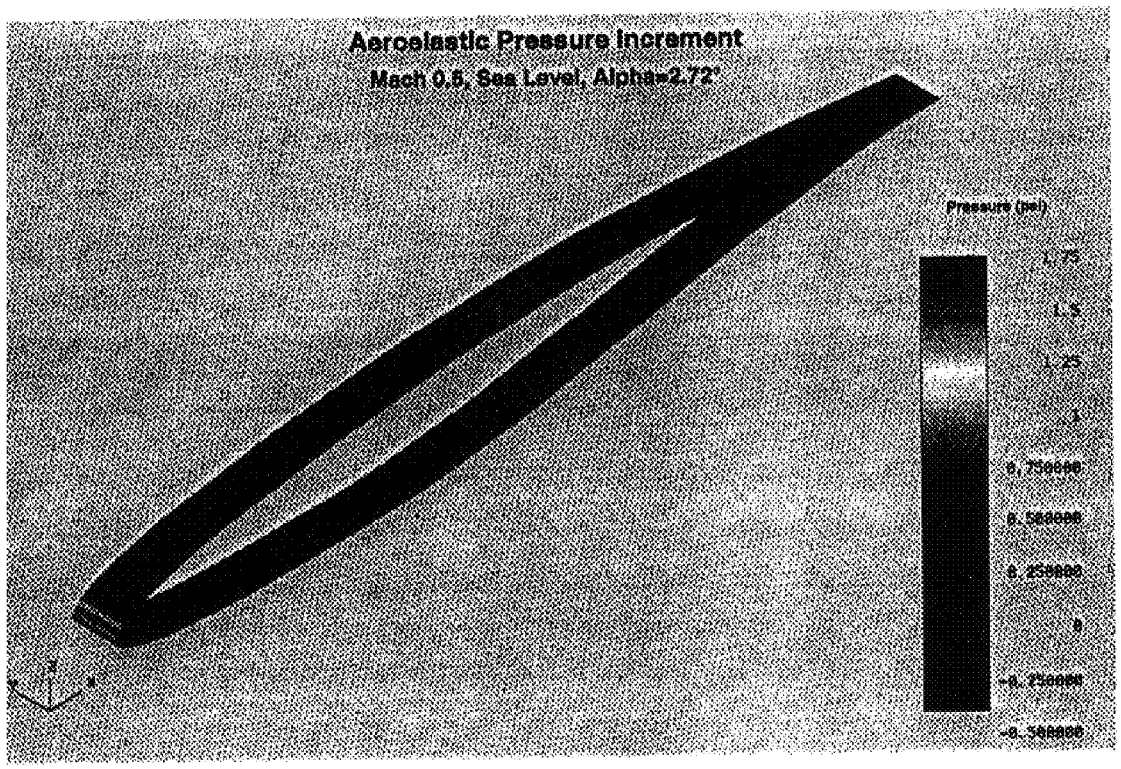
Fig. 17 ASTROS Static Aeroelastic Solution
RAE 2822 Wing Section, $M_\infty = 0.5$, $K_\theta = 0.5 \times 10^6$

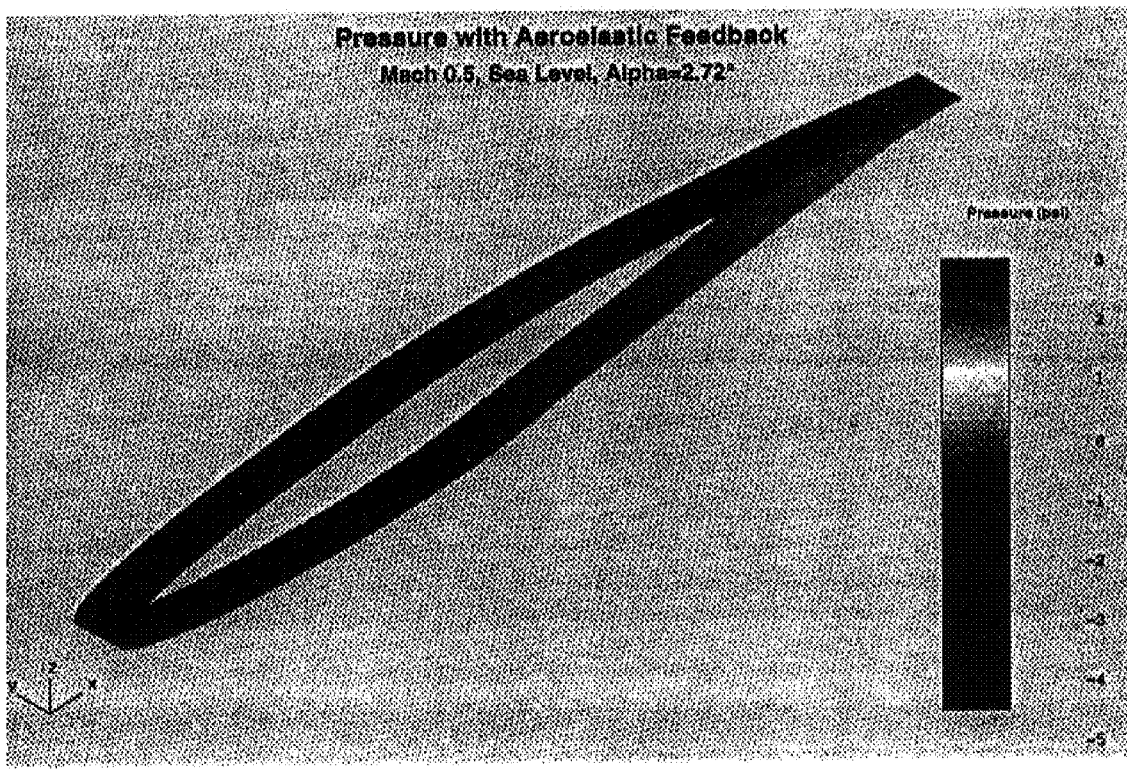
Fig. 18 ASTROS Static Aeroelastic Solution
RAE 2822 Wing Section, $M_\infty = 0.5$, $K_\theta = 0.5 \times 10^6$

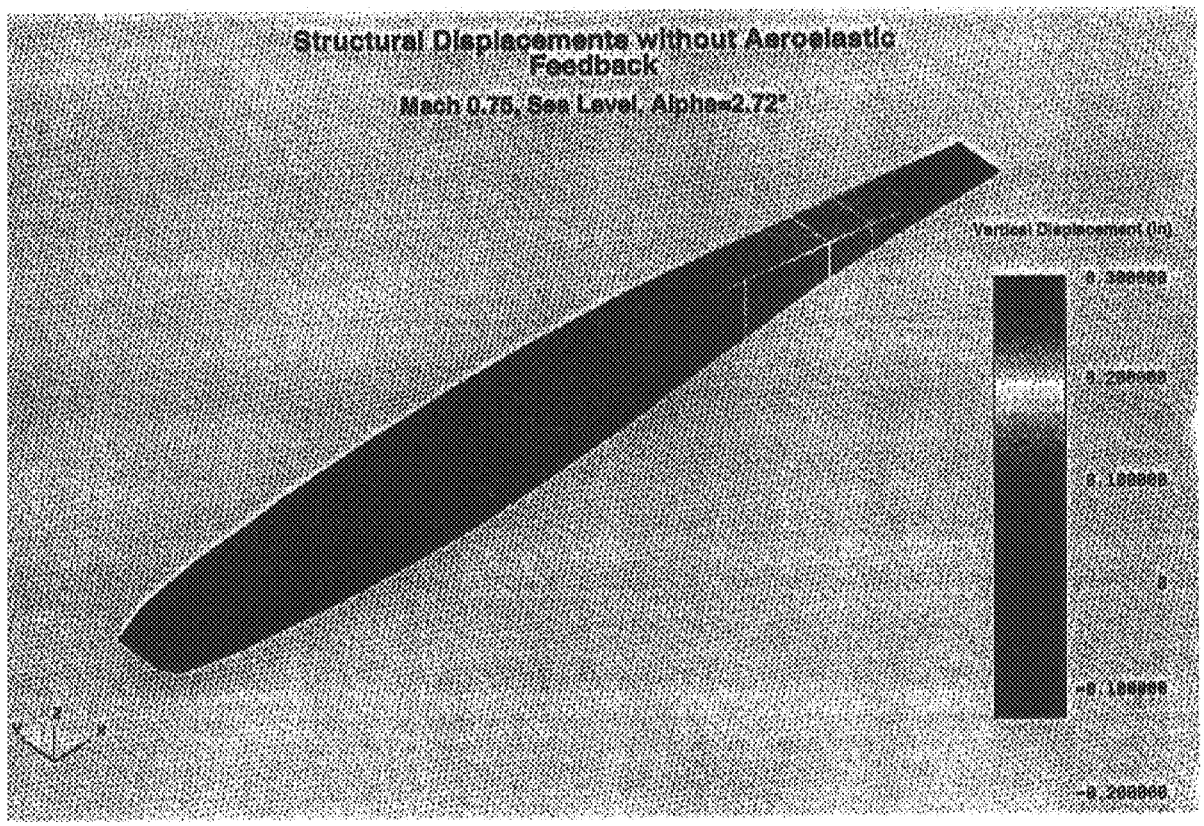
Fig. 19 ASTROS Static Aeroelastic Solution
RAE 2822 Wing Section, $M_\infty = 0.75$, $K_\theta = 7.5 \times 10^6$

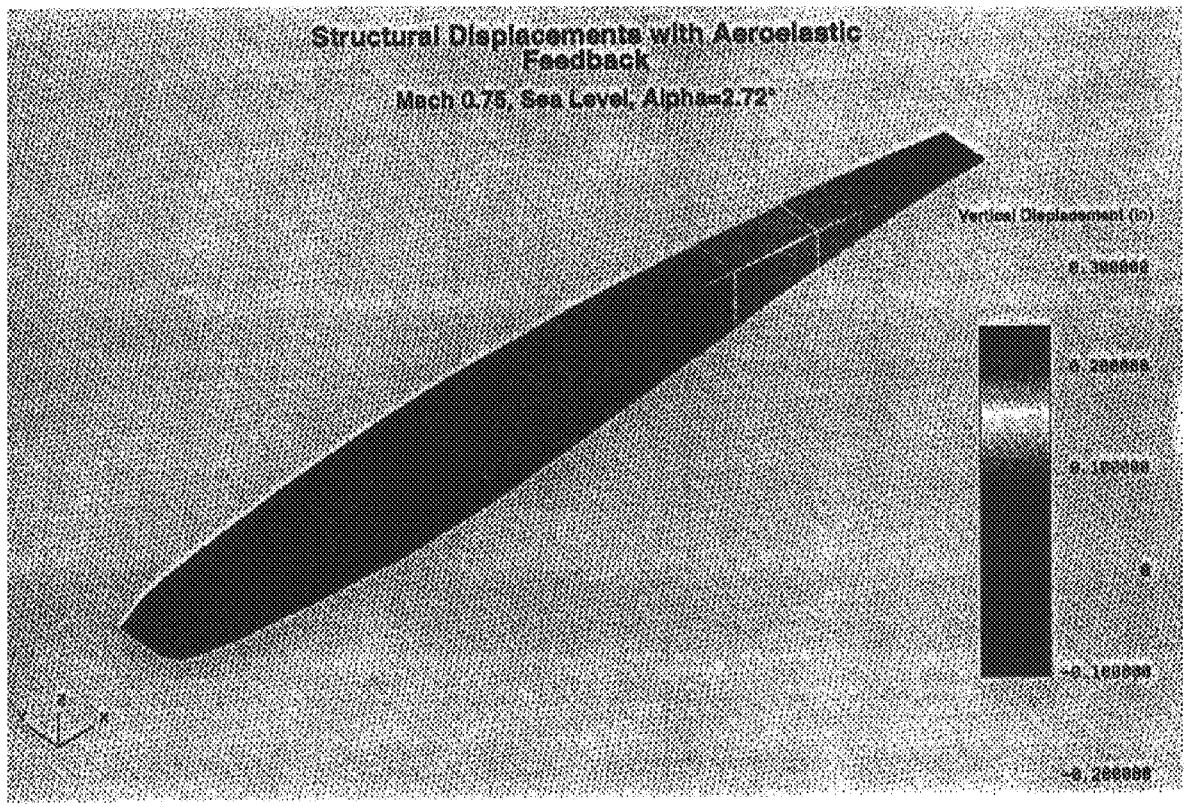
Fig. 20 ASTROS Static Aeroelastic Solution
RAE 2822 Wing Section, $M_\infty = 0.75$, $K_{ij} = 7.5 \times 10^6$

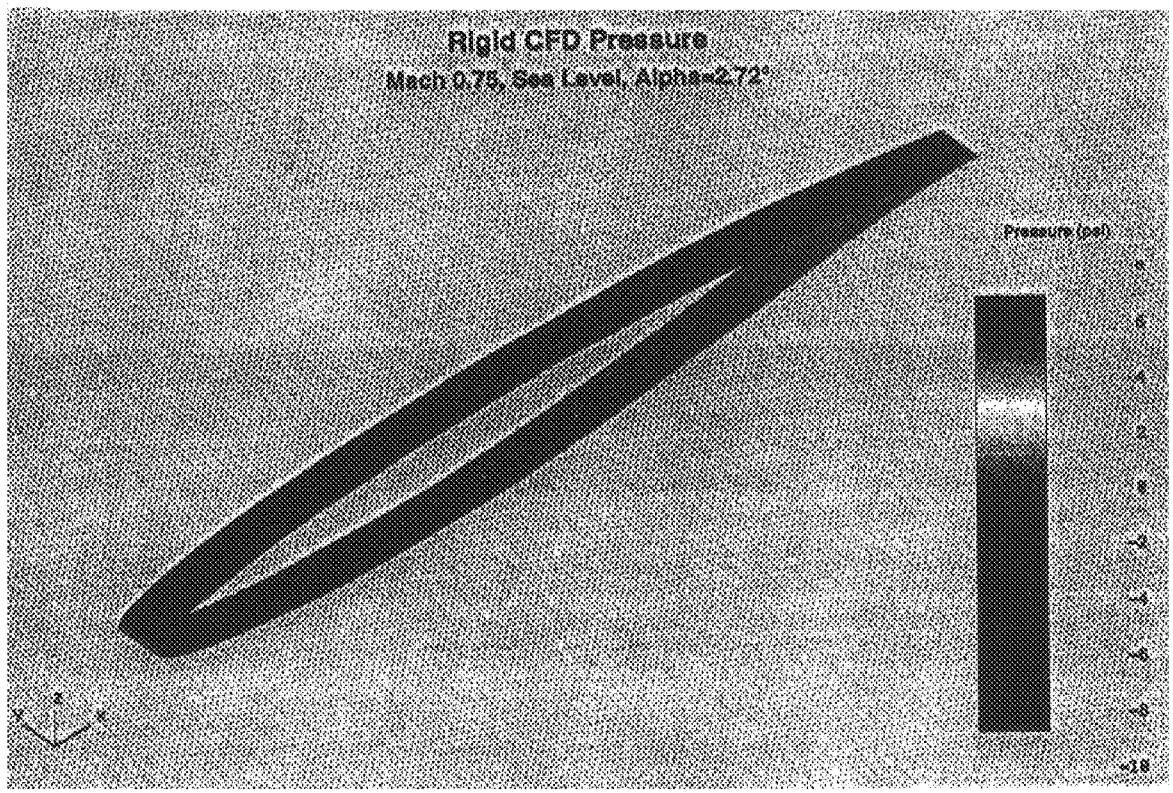
Fig. 21 ASTROS Static Aeroelastic Solution
RAE 2822 Wing Section, $M_\infty = 0.75$, $K_\theta = 7.5 \times 10^6$

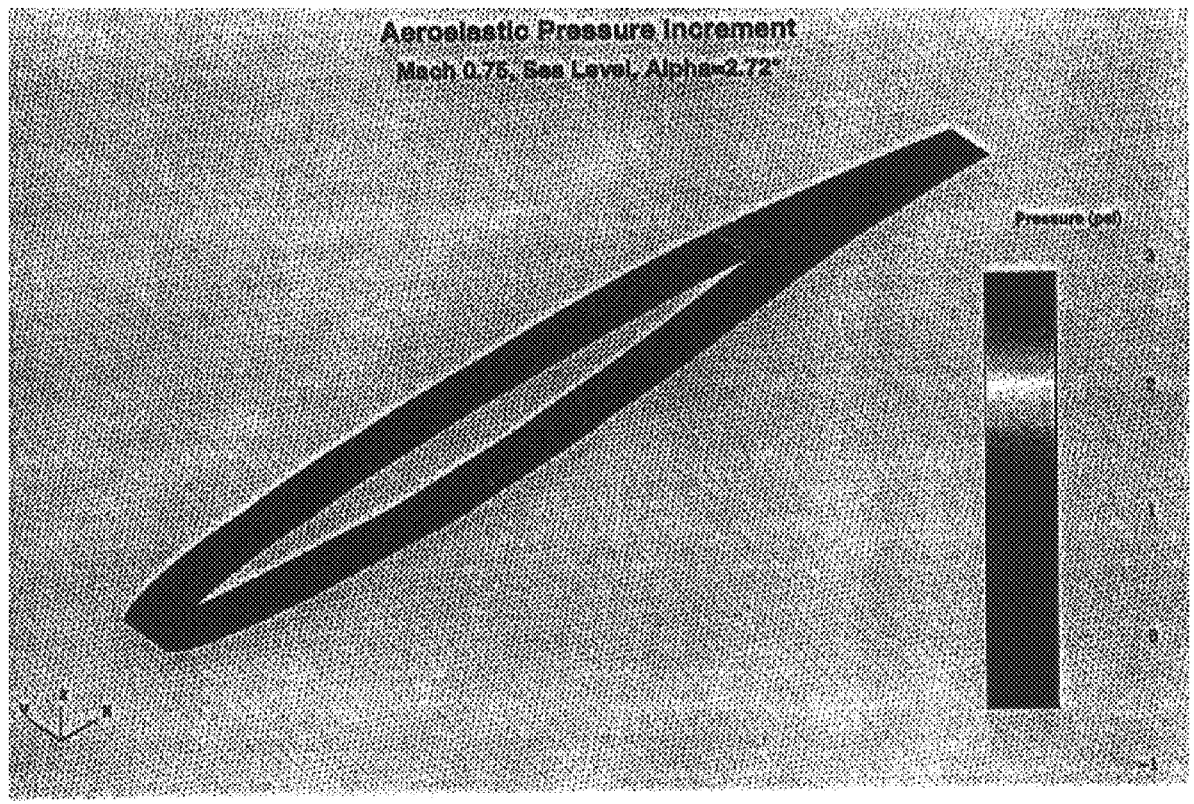
Fig. 22 ASTROS Static Aeroelastic Solution
RAE 2822 Wing Section, $M_\infty = 0.75$, $K_\theta = 7.5 \times 10^6$

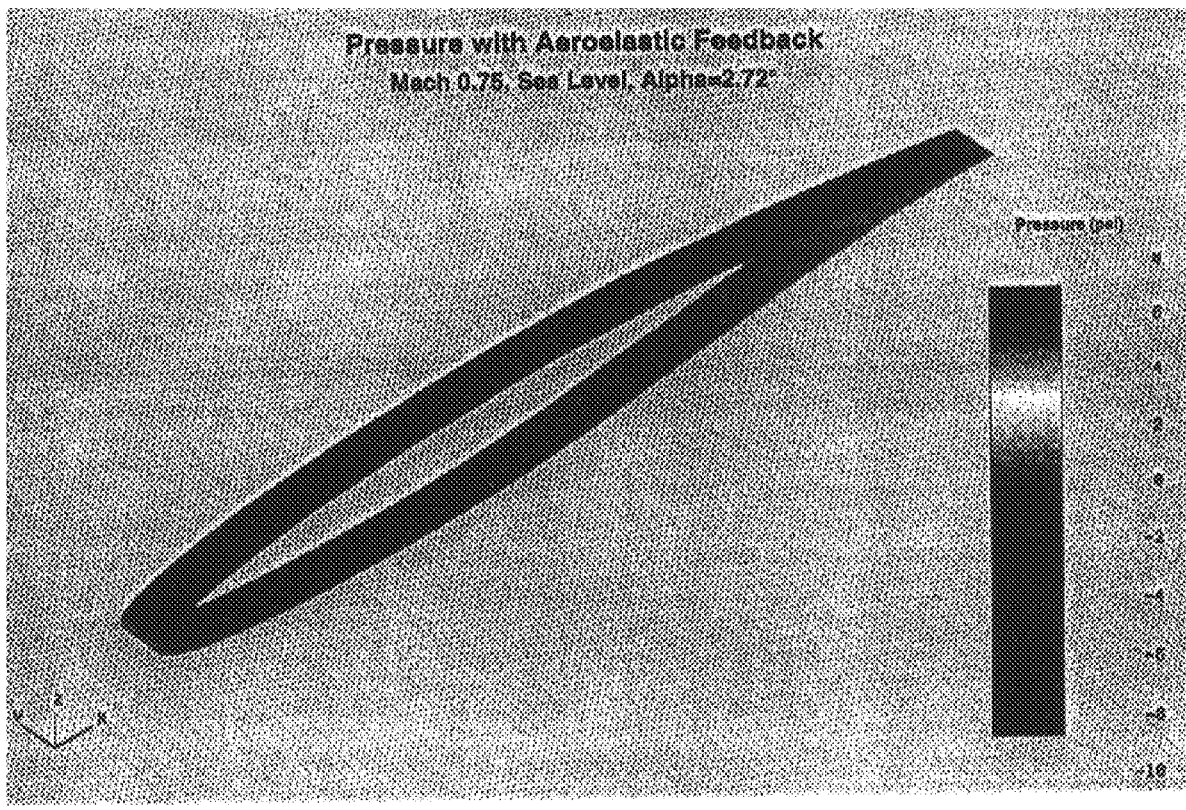
Fig. 23 ASTROS Static Aeroelastic Solution
RAE 2822 Wing Section, $M_\infty = 0.75$, $K_\theta = 7.5 \times 10^6$

METHOD OF PREDICTING CHANGE IN SHAPE OF A SOLID STRUCTURE

REFERENCE TO RELATED APPLICATIONS

This application claims the benefit of U.S. Provisional Application No. 60/012,720, and filed Mar. 4, 1996, entitled "METHOD TO PREDICT THE CHANGE IN SHAPE OF A SOLID STRUCTURE AS A RESULT OF FORCE APPLIED TO IT BY A FLUID".

FIELD OF THE INVENTION

The invention relates to computer implemented methods that predict the behavior of a solid structure in response to loads applied to it. In particular the invention relates to the cases where the force applied to the structure is applied by a fluid.

BACKGROUND OF THE INVENTION

The prediction of the behavior of structures under loads and forces applied to them is an area that offers economic benefits to man kind. For example: one is capable of utilizing computer implemented methods to predict whether a bridge will fail as a result of the loads applied to it by the cars driving on it, or, whether an airplane structure is strong enough to withstand the loads applied to it in flight and still maintain its structural integrity. Thus, being able to predict the behavior of a structure in response to forces applied to it is of great importance and value to any person involved in art of designing structures.

In particular cases the force applied to the structure is done so by a fluid that comes in contact with the structure. Examples include airplanes flying through the air, or combustion products leaving through an exhaust manifold.

Fluids apply force to a structure both through viscous forces and pressure forces. Viscous forces act in a direction tangent to the surface at every point they apply and pressure forces apply normal to the surface.

A particular sub-area of the art has to do with cases in which the forces applied by the fluid are of sufficient magnitude as to change the shape of the structure. Any person flying in a commercial jet liner who observed the wing of the airplane in flight and compared it with the appearance of the wing on the ground would notice that the wing flexes upwards in flight. This is a result of the lift force applied to the wing. In the case of an airplane this force is so great as to lift the whole airplane and its passengers skywards.

Consider now a computer implemented method for predicting the response of the structure to the applied loading. One may presume of the shape of the structure and compute the fluid forces on the structure and then proceed to compute the response of the structure to the fluid forcing. In many cases (such as the force on the wing) the response of the structure will be to deform in shape. However, if the shape of the structure has deformed the estimate of the fluid force on the structure calculated previously will no longer be valid. Hence, one needs a coherent strategy for computing by means of a computer the equilibrium state of the structure and the fluid.

The art of using computer implemented program methods to predict and compute the equilibrium state of a structure and a fluid applying a force to it has evolved in stages.

The simplest approach to computing the equilibrium state of the structure is to iterate the procedure:

start with an initial state for the structure compute the fluid force on the structure compute the shape the structure will obtain as a result of the fluid force regard the later as the initial state for the structure recompute the fluid forces . . . and so forth.

This iteration will continue until the incremental change in the shape of the structure will be so small so as to not warrant additional improvements. The simple iterative approach is computationally intensive and there is no guarantee that the procedure would converge.

An improved approach that has been demonstrated in the past is described as follows: Consider a finite element model of the structure:

$$[M]\{(\ddot{\delta x})+([K]-[\delta F_a])\{\delta x\}=\{F_a\}$$

Here M is the mass matrix for the structure, K is the stiffness matrix, and Fa, is the fluid force applied to the configuration of the structure prior to deformations. $\delta F_a$ is the matrix that describes the changes in the fluid forcing as a result from small changes in the shape of the structure. $\delta F_a$ is commonly referred to as the "aerodynamic stiffness matrix". $\delta x$ denotes the displacement of the structure with respect to its original shape once loads are applied to it. Note that if one can obtain accurate estimates for $F_a$ and $\delta F_a$, this is a viable method of solution that does not require the sorts of iterations described in the previous paragraph. Moreover, this formulation fits well into existing methods, namely finite element methods, for the prediction of the response of a structure to force applied to it.

The art prior to this invention directs that the matrix $\delta F_a$ be calculated based on methods known as "panel methods" (see Johnson, E. H., and Venkayya, V. B. "Automated Structural Optimization System (ASTROS) Volume 1, Theory Manual," AFWAL TR-88-3028, December 1988. US Air Force, Wright Laboratories). Panel methods characterize the flow by a distribution of sources, sinks, and vortices on the surface.

The deficiency of panel methods is that they cannot resolve important flow phenomena such as shocks and separation. For example: shocks occur when the flow is transonic (i.e. partly supersonic and partly subsonic) and supersonic. Shocks occur in the flow of air of a jetliner or business jet at cruise and over higher speed aircraft. For example: separation occurs when an airplane pitches to a high angle of attack, when the flow enters a diverging channel whose adverse pressure gradient is sufficient to cause separation and in other applications.

The deficiency of panel methods has been recognized for the last thirty years. In applications that require the prediction of the flow field alone, ignoring the structural deformations, methods for the computer implemented solution of the Euler and Navier-Stokes equations have been developed. These methods are known as CFD (Computational Fluid Dynamics) methods.

The prior art did not contain any possibility for the incorporation of CFD based methods into the calculation of the aerodynamic stiffness matrix $\delta F_a$. Rather, the prior art relied heavily on the linearity built into the panel methods. Prior art did indicate how to compute the forcing $F_a$—this involves the interpolation of the aerodynamic forces from the CFD grid to the finite element grid and is conceptually straightforward.

Thus, this invention makes the contribution of disclosing how to compute the matrix $\delta F_a$ with methods that will produce CFD quality results, in particular results that are applicable to flows with shocks and separation.

SUMMARY OF THE INVENTION

The present invention presents a computer implementable method that can predict the infinitesimal change of a fluid flow in connection with a solid body, with respect to a family of structural deformations.

An efficient method to compute this sensitivity is disclosed: this is done by a solution of the so called "sensitivity equation". Detailed instructions on how to set up such a calculation, and in particular choosing the appropriate boundary conditions is disclosed.

Different methods to describe the deformations of the structure, which later lead to the boundary conditions for the sensitivity are disclosed as well.

BRIEF DESCRIPTION OF THE DRAWING

FIG. 2 is a comparison of the predictions of the disclosed method with an approximation of the predicted quantity obtained by means of applying a finite difference formula to two solutions of the flow problem.

FIG. 3 shows the possible structural deformations that may be attained in the problem used for the demonstration of the method.

FIG. 4 shows the solution of the flow equations for a free stream velocity of Mach 0.5 in the sample problem solved.

FIG. 5 shows the solution of the flow equations for a free stream velocity of Mach 0.75 in the sample problem solved.

FIG. 6 shows the sensitivity of the pressure with respect to select infinitesimal deformations of the structure in the sample problem solved with a free stream Mach number of 0.5.

FIG. 8 shows the sensitivity of the pressure with respect to select infinitesimal deformations of the structure in the sample problem solved with a free stream Mach number of 0.75 (note dramatic effect of the shock).

FIG. 10 is a comparison of the predictions of the disclosed method with an approximation of the predicted quantity obtained by means of applying a finite difference formula to two solutions of the flow problem for the case of a change in pitch at a free stream Mach number of 0.5.

FIG. 11 is a comparison of the predictions of the disclosed method with an approximation of the predicted quantity obtained by means of applying a finite difference formula to two solutions of the flow problem for the case of a change in pitch at a free stream Mach number of 0.75.

FIG. 12 is a view of the structural model implemented in the ASTROS finite element program for the purposes of this demonstration.

FIG. 13 contains further details of the structural model and the nodes used to interface the aerodynamic calculation with the finite element calculation.

FIG. 14 shows the combined aeroelastic solution without the matrix $\delta F_a$ for a free stream Mach number of 0.5.

FIG. 15 shows the combined aeroelastic solution with the matrix $\delta F_a$ computed as disclosed in this invention for a free stream Mach number of 0.5. Note the marked difference in the range of deformations compared to the case in which the matrix $\delta F_a$ was not included.

FIG. 16 shows the CFD pressure without the matrix $\delta F_a$ for a free stream Mach number of 0.5.

FIG. 17 shows the CFD pressure increment computed through the matrix $\delta F_a$, for a free stream Mach number of 0.5.

FIG. 18 shows the CFD pressure with the correction due to the matrix $\delta F_a$ for a free stream Mach number of 0.5.

FIG. 19 shows the combined aeroelastic solution without the matrix $\delta F_a$ for a free stream Mach number of 0.75.

FIG. 20 shows the combined aeroelastic solution with the matrix $\delta F_a$ computed as disclosed in this invention for a free stream Mach number of 0.75.

FIG. 21 shows the CFD pressure without the matrix $\delta F_a$ for a free stream Mach number of 0.75.

FIG. 22 shows the CFD pressure increment computed through the matrix $\delta F_a$ for a free stream Mach number of 0.75.

FIG. 23 shows the CFD pressure with the correction due to the matrix $\delta F_a$ for a free stream Mach number of 0.75.

DETAILED DESCRIPTION OF THE INVENTION

Detailed Description of the Invention
Overview of the Method of the Invention

Figure 24:
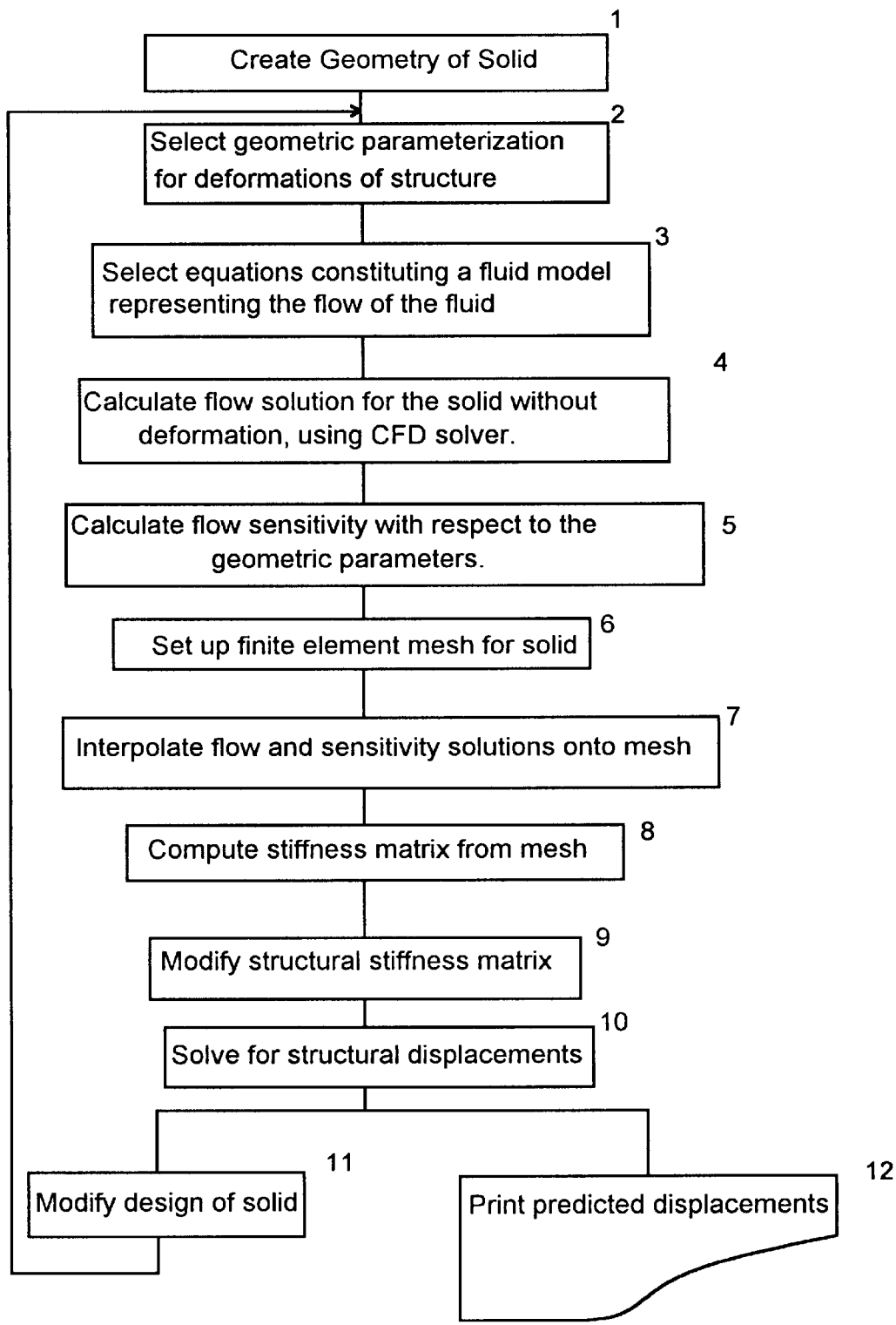
FIG. 24 shows a flowchart of the method of the invention.

FIG. 24 shows a general flowchart of the method of the invention. Following this overview, based on FIG. 24, the various steps of the method will be described in detail with reference to the other figures.

(1) First, the solid structure to be analyzed is created or described (2) A geometric parameterization for the deformations of the structure is selected.

(3) Equations constituting a fluid model representing the flow of fluid are selected. These equations can be non-linear, such as Navier-Stokes or Euler equations.

(4) A flow solution for the structure without deformation is calculated, using a computational fluid dynamics solver;

(5) The flow sensitivity with respect to the geometric parameters is calculated, using the sensitivity equation method, finite differences, or other techniques.

(6) A finite element mesh for the structure is set up using known techniques.

(7) The flow and sensitivity solutions are interpolated onto the finite element mesh (8) A stiffness matrix is computed from this finite element mesh.

(9) The structural stiffness matrix computed in step (8) is modified to account for flexibility of the structure.

(10) Solve for structural displacements of the solid.

Then, with the results in hand, one can either modify the design and try the method again (11), or print out the results (12).

Sensitivity Equation Development $$p' = (\gamma - 1)\left[e' - \frac{\rho'}{2}(u^2 = +v^2) - mu' - nv'\right]$$

The matrices A and B above are identical to the flux Jacobian matrices for the inviscid flow (Euler) equations. The A matrix is, for example, $$A = \begin{bmatrix} 0 & \xi_x & \xi_y & 0 \\ -uU + \xi_x\left[\frac{1}{2}(\gamma-1)(u^2+v^2)\right] & \xi_x(3-\gamma)u + \xi_y v & -(\gamma-1)\xi_x v + \xi_y u & (\gamma-1)\xi_x \\ -vU + \xi_y\left[\frac{1}{2}(\gamma-1)(u^2+v^2)\right] & -(\gamma-1)\xi_y y + \xi_x v & \xi_y(3-\gamma)v + \xi_x u & (\gamma-1)\xi_y \\ U\left[-\frac{a^2}{\gamma-1} + \left(\frac{1}{2}\gamma-1\right)(u^2+v^2)\right] & \xi_x\left[\frac{a^2}{\gamma-1} + \frac{1}{2}(u^2+v^2) - (\gamma-1)Uu\right] & \xi_y\left[\frac{a^2}{\gamma-1} + \frac{1}{2}(u^2+v^2) - (\gamma-1)Uv\right] & \gamma U \end{bmatrix} \quad (5)$$

The sensitivity equations, as developed by Borggaard and Burns in "A Sensitivity Equation Approach to Shape Optimization in Fluid Flows" in the context of flow shape optimization, with no regard to shape deformation due to aerodynamic forces, provide the means necessary to compute the desired aerodynamic stiffness matrix, also called the aerodynamic influence coefficient (AIC) matrix. The equations are obtained by differentiating the Euler or Navier-Stokes equations with respect to a change in a limited number of independent (or design) variables, $d_k$. In this case, the design variables are any conveniently chosen set of parameters that provide a basis for compactly defining the rigid and flexible surface geometries. Since the governing equations do not have a direct functional dependence upon the design variable, the sensitivity equations are obtained by formally differentiating the flow equations with respect to the design variable. For simplicity, results are given for the two dimensional, inviscid equations in transformed coordinates.

$$\frac{\partial Q'}{\partial t} + \frac{\partial F'}{\partial \xi} + \frac{\partial G'}{\partial \eta} = 0 \quad (1)$$

$$Q' = \frac{1}{J}Q' = \frac{1}{J}\begin{pmatrix} \rho' \\ m' \\ n' \\ e' \end{pmatrix} \quad F' = \frac{1}{J}(AQ') \quad G' = \frac{1}{J}(BQ') \quad (2)$$

$$p' = \frac{\partial \rho}{\partial d_k} \quad m' = \frac{\partial(\rho u)}{\partial d_k} \quad n' = \frac{\partial(\rho u)}{\partial d_k} \quad (3)$$

$$c' = \frac{\partial(e)}{\partial d_k} = \frac{\partial\left(\rho\left[e_i + \frac{1}{2}(u^2+v^2)\right]\right)}{\partial d_k}$$

Sensitivities for the primitive variables are similarly, $$u' = \frac{m'}{\rho} - \frac{m\rho'}{\rho^2} \quad v' = \frac{n'}{\rho} - \frac{m\rho'}{\rho^2} \quad (4)$$

A finite volume, upwind-biased flow method (in the case of the numerical demonstration shown here, NASA Langley's CFL2D Or CFL3D codes) is utilized for the computation of rigid airloads (although other CFD methods may be substituted). For consistency with the new method, the sensitivity equations are solved with the same finite volume upwind-biased method utilized in the CFL2D and CFL3D codes (see, Vatsa, V. N., Thomas, J. L., and Wedan, B. W., "Navier-Stokes Computations of Prolate Spheroids at Angle of Attack", AIAA Paper 87–2627, 1987). In the finite volume formulation, the discretized sensitivity equations are:

$$\frac{Q'^{m+1} - Q'^m}{\Delta t} + \frac{F'^{m+1}_{i+\frac{1}{2}} - F'^{m+1}_{i-\frac{1}{2}}}{\Delta \xi} + \frac{G'^{m+1}_{j+\frac{1}{2}} - G'^{m+1}_{j-\frac{1}{2}}}{\Delta \eta} = 0 \quad (6)$$

where i, j denote cell centroids, $i\pm\frac{1}{2}$ and $j\pm\frac{1}{2}$ denote cell faces, and the transformation derivatives and other metric terms are implemented geometrically.

The sensitivity equations are linear with respect to the sensitivity variables. Moreover, the flux Jacobian matrices are identical to the flux Jacobian matrices of the inviscid flow equations and are functions of the flow variables only. A converged steady state flow solution is required as an input to the sensitivity equations. Thus, the sensitivity equations form a linear system with variable coefficients as the flow varies throughout the domain. A sensitivity equation solution is required for variation with respect to each design variable. Sensitivity equation solutions differ from each other only through the boundary conditions (reflecting the explicit dependence of the boundary conditions upon the design variable) and the initial conditions. Because the coefficient matrices are functions of the same steady state flow solution and are identical to the matrices of the flow equations, the sensitivity equation method can be efficiently implemented by modifying the basic flow method to solve for a new flux function (the sensitivity flux) and changing the boundary and initial conditions to reflect the dependence upon the design variables.

Following the flow solver method development, the sensitivity equation flux functions are written as linear functions at the n'th time level. For efficiency, a diagonalized form of the method is introduced, here expressed in terms of the primitive sensitivity variables, q'=(p'u'v'p')$^T$. The sensitivity equation is then implemented as two approximate factorization sweeps:

$$\left[\frac{I}{J\Delta t} + \delta_\xi \lambda_\xi\right]\delta w'^* = T_\xi^{-1}[R^n] \qquad (7a)$$

$$\delta q'^* = M^{-1} T_\xi \delta w'^*$$

$$\left[\frac{(I)}{J\Delta t} + \delta_\eta \lambda_\eta\right]\delta w' = \frac{(I)}{J\Delta t} T_\eta^{-1} M \delta q'^*$$

$$\delta q'^n = M^{-1} T_\eta \delta w' \qquad (7b)$$

$$q'^{n+1} = q'^n + \delta q'^n$$

In the above, $$M = \frac{\partial Q'}{\partial q'},$$

J is the Jacobian of the coordinate transformation, R is the steady state sensitivity residual, $\lambda$ and T are the eigenvalues and eigenvectors of the inviscid flux Jacobians, and $\partial w'$ is a temporary variable defined above by context. The eigenvalues and eigenvectors and the M matrix are the same for all sensitivity equation sets and identical to the corresponding terms in the flow algorithm. Thus, for efficiency, they can be precomputed and stored.

The CFL2D and CFL3D codes utilize Roe's approximate Riemann solver. For the sensitivity equations, the approximate Riemann solver must be reformulated for the sensitivity equation flux. The flux at the i+½ cell face, for example, is given as $$F'_{i+\frac{1}{2}} = \frac{1}{2}\left[F'_{i+\frac{1}{2}}(q_l,q'_l) + F'_{i+\frac{1}{2}}(q_r,q'_r) - |\tilde{A}|_{i+\frac{1}{2}} M \Delta q'\right] \qquad (8)$$

where $$F'_{i+\frac{1}{2}} = \frac{|\nabla \xi|}{J}\begin{bmatrix} \rho U' + U\rho' \\ \rho u U' + U(\rho u' + u\rho') + \xi_x p' \\ \rho v U' + U(\rho v' + v\rho') + \xi_y p' \\ \rho\left(\frac{c^2}{\gamma-1} + \alpha\right)U' + U\alpha\rho' + \rho U(uu' + vv') + \frac{\gamma}{\gamma-1}p' \end{bmatrix} \qquad (9)$$

and $$U = \xi_x u + \xi_y v \qquad (10)$$

$$U' = \xi_x u' + \xi_y v'$$

$$\alpha = \frac{1}{2}(u^2 + v^2)$$

In equation 9, the state and sensitivity variables are evaluated in terms of the following upwind-biased interpolations:

$$q'_{h+\frac{1}{2}} = q'_i + [(1-k)\nabla q'_i + (1+k)\Delta q'_i] \qquad (11)$$

$$q'_{n+\frac{1}{2}} = q'_{i+1} + [(1+k)\nabla q'_{i+1} + (1-k)\Delta q'_{i+1}]$$

where $\nabla q$ and $\Delta q$ are backward and forward differences and k is an adjustable constant that determines the order of interpolations. The dissipation term is given as:

$$|\tilde{A}|M\Delta q' = \begin{bmatrix} \alpha_4 \\ \tilde{u}\alpha_4 + n_x\alpha_5 + \alpha_6 \\ \tilde{v}\alpha_4 + n_y\alpha_5 + \alpha_7 \\ \tilde{H}\alpha_4 + \tilde{U}\alpha_5 + \tilde{u}\alpha_6 + \tilde{v}\alpha_7 - \frac{\tilde{c}^2}{\gamma-1}\alpha_1 \end{bmatrix} \qquad (12)$$

where $$\alpha_1 = |\tilde{U}|\left(\Delta\rho' - \frac{\Delta\rho'}{\tilde{c}^2}\right) \qquad (13)$$

$$\alpha_2 = \frac{1}{2\tilde{c}^2}|\tilde{U} + \tilde{c}|(\Delta p' + \tilde{\rho}\tilde{c}\Delta U')$$

$$\alpha_3 = \frac{1}{2\tilde{c}^2}|\tilde{U} - \tilde{c}|(\Delta p' + \tilde{\rho}\tilde{c}\Delta U')$$

$$\alpha_4 = \alpha_1 + \alpha_2 + \alpha_3$$

$$\alpha_5 = \tilde{c}(\alpha_2 - \alpha_3)$$

$$\alpha_6 = |\tilde{U}|(\rho\Delta u' - n_x\tilde{\rho}\Delta U')$$

$$\alpha_7 = |\tilde{U}|(\rho\Delta v' - n_y\tilde{\rho}\Delta U')$$

and, for example, $$\Delta\rho' = \rho'_r - \rho'_l \qquad (14)$$

$$\Delta U' = n_x(u'_r - u'_l) + n_y(v'_r - v'_l)$$

$$n_x = \frac{\xi_x}{|\nabla\xi|} \quad n_y = \frac{\xi_y}{|\nabla\xi|}$$

In the flow algorithm, (~) denotes a Roe averaged term, introduced to make the dissipative term conservative. For the sensitivity equations, Roe averaging cannot be achieved and the corresponding terms are replaced by an arithmetic average of the left and right states, $q_l$ and $q_r$. Conservation is not required, however, since there is no conservation law expressed by the sensitivity equations.

Sensitivity Equation Boundary Conditions (with Surface Shape as a Design Variable)

The sensitivity boundary conditions are obtained by differentiating the boundary conditions for the flow method. At the inflow and outflow boundaries, the boundary conditions are not explicit functions of the surface design variable coefficients, $d_k$ corresponding to a surface displacement. For the inflow boundary condition, for example, differentiating the fixed inflow boundary values results in setting the sensitivity equation boundary conditions to zero. On the deformable body surface, the geometry is functionally dependent upon the design variables and this functional dependence is accounted for in the development of the surface boundary conditions.

At the wing or body surface of an inviscid flow, the only physical boundary condition is the expression of flow tangency, u•n=0. Numerically, the flow method requires the complete specification of the flow state of the surface. The CFL2D and CFL3D codes further extrapolate the tangential component of velocity along with pressure and density from their cell centroid values to the cell face surface $$u_w = u_1 - n_x(n \cdot u_1)$$
$$v_w = v_1 - n_y(n \cdot u_1) \quad (15)$$
$$p_w = p_1$$
$$\rho_w = \rho_1$$

where the subscript w denotes a wall or surface value and the subscript 1 denotes a value at the first cell centroid above the surface. The normal vector a can be written for the geometries of interest (2D wing sections or 3D wing sections with deformation restricted to the xy plane) as $$n = -\frac{y_\xi}{\sqrt{x_\xi^2 + y_\xi^2}} i + \frac{x_\xi}{\sqrt{x_\xi^2 + y_\xi^2}} j \quad (16)$$

Then the velocity boundary condition becomes $$u_w = au_1 + bv_1, \quad vw = bu_1 + cv_1 \quad (17)$$

where $$a = \frac{x_\xi^2}{x_\xi^2 + y_\xi^2} \quad b = \frac{x_\xi y_\xi}{x_\xi^2 + y_\xi^2} \quad c = \frac{y_\xi^2}{x_\xi^2 + y_\xi^2} \quad (18)$$

For the problems of interest, the functional relationship of the design variables is specified to occur only through the y variable. That is, on the surface $$u_w = u_w(x(\xi), y(\xi, d_k), d_k) \quad (19)$$
$$v_w = v_w(x(\xi), y(\xi, d_k), d_k)$$

For points interior to the surface $$u_1 = u_1(x(\xi, \eta), y(\xi, \eta)) \quad (20)$$
$$v_1 = v_1(x(\xi, \eta), y(\xi, \eta))$$

Thus when differentiating with respect to the design variables, for points on the wall, the functional dependence occurs implicitly through the y variable as well as explicitly. For example, u derivatives are $$\frac{d}{d d_k}(u_w) = \frac{\partial u_w}{\partial y} \frac{\partial y}{\partial d_k} + \frac{\partial u_w}{\partial d_k} \quad (21)$$

$$\frac{d}{d d_k}(u_1) = \frac{\partial u_1}{\partial d_k}$$

Differentiating equation 17 gives $$\frac{\partial u_w}{\partial d_k} = -\frac{\partial u_w}{\partial y} \frac{\partial y}{\partial d_k} + \left(\frac{\partial a}{\partial d_k} u_1 + a \frac{\partial u_1}{\partial d_k}\right) + \left(\frac{\partial b}{\partial d_k} v_1 + b \frac{\partial v_1}{\partial d_k}\right) \quad (22)$$

$$\frac{\partial v_w}{\partial d_k} = -\frac{\partial v_w}{\partial y} \frac{\partial y}{\partial d_k} + \left(\frac{\partial b}{\partial d_k} u_1 + b \frac{\partial u_1}{\partial d_k}\right) + \left(\frac{\partial c}{\partial d_k} v_1 + c \frac{\partial v_1}{\partial d_k}\right)$$

The right hand side terms of equation 22 are known from geometry and the known flow solution. Similar expressions hold for $p_w$ and $\rho_w$.

$$\frac{\partial p_w}{\partial d_k} = -\frac{\partial p_w}{\partial y} \frac{\partial y}{\partial d_k} + \frac{\partial p_1}{\partial d_k} \quad (23)$$

$$\frac{\partial \rho_w}{\partial d_k} = -\frac{\partial \rho_w}{\partial y} \frac{\partial y}{\partial d_k} + \frac{\partial \rho_1}{\partial d_k}$$

Surface Characterization in Terms of Bezier Burnstein Polynomials

Several investigators have demonstrated the utility of Bezier-Burnstein polynomials for providing a compact representation of 2D curves and 3D surfaces (see, e.g. Burgreen, G. W., and Baysal, O., "Three Dimensional Aerodynamic Shape Optimization of Wings Using Sensitivity Analysis", AIAA Paper 94–0094, 1994). The Bezier polynomials have the advantages that: (1) a limited number of polynomials are sufficient to describe an arbitrary deformation in the surface shape and (2) the variation with respect to a change in the Bezier coefficients provides a continuous representation of the deformed surface. For the two dimensional case considered here (an airfoil, for example), the y coordinate surface geometry is described by the N+1 Bezier coefficients, $d_k$.

$$y(\xi') = \sum_{k=0}^{N} d_k B_k^N(\xi') \quad \text{where} \quad B_k^N(\xi') = \frac{N!}{k!(N-k)!} \xi'^k (1-\xi')^{N-k} \quad (24)$$

The $\xi$ coordinate is the computation variable that corresponds to the circumferential direction $\xi'$ is a normalized coordinate (0:1) that runs from the trailing edge on the lower surface to the trailing edge of the upper surface. The $d_k$ are the Bezier coefficient design variables (the total number of design variables corresponds to the number of free coefficients on the upper and lower surfaces). An arbitrary surface geometry can be described by appropriately adjusting the values of the Bezier coefficients. For a given geometry, the initial undeformed surface is obtained by a least squares fit for the design variables providing the best match at each of the surface grid point locations. In the results to follow (an RAE 2822 airfoil), the y surface coordinate is represented in terms of a single 17th order polynomial. If necessary, the Bezier representation can be extended to model changes in the x variable as well with a corresponding increase in the number of design variables and sensitivity solutions. There is also a two dimensional Bezier surface definition so the extension to surfaces is routine.

Integration with a Finite Element Code (ASTROS) for Non-Iterative Static Aeroelastic Analysis The integration of the Euler-based load and load sensitivity information into the ASTROS Computer code is accomplished through Lockheed Martin's alternate aerodynamic interface. This interface, originally developed as a means to replace the USSAERO aerodynamics model with other panel codes, requires rigid-body aerodynamic pressure coefficients (AIRFRC matrix) and pressure coefficient sensitivities (AIC matrix) corresponding to shape change as a result of applied loads. Both quantities are computed external to ASTROS based upon the initial, undeformed surface geometry. In addition, since the sensitivity analysis is developed in terms of Bezier coefficient design variables, transformation matrices are required to relate y coordinate displacements to changes in the Bezier coefficient design variables. If desired in a specific situation, other polynomials such as Non-uniform Rational B-splines (NURBs) or other splines can be used in place of the Beziers.

The flow solver provides pressures at the surface cell face centroids for those grid cells adjacent to the airfoil surface. This is similar to the panel code except that Euler-based CFD grid is more refined with more cell faces. The surface pressure coefficient values are loaded into an m dimensional vector (corresponding to the m cell face surface centers).

Pressure coefficient sensitivity is defined as:

$$Cp'_{i,k} = \frac{dCp_1}{d(d_k)} = \frac{2}{\gamma M_\infty^2} \frac{d}{d(d_k)}\left(\frac{p_1}{p_\infty}\right) \text{ where } Cp_i = \frac{2}{\gamma M_\infty^2}\left(\frac{p_i}{p_\infty} - 1\right) \quad (25)$$

The term, $$\frac{d(p_i/p_\infty)}{d\,d_k},$$

is the sensitivity of the pressure at the ith grid surface cell face with respect to a change in the kth design variable, $d_k$, and is obtained from the sensitivity equation solution. The (aerodynamic influence coefficient AIC) matrix is thus defined as:

$$[AIC] = \begin{bmatrix} \frac{\partial C_p(\xi_1)}{\partial d_0} & \frac{\partial C_p(\xi_1)}{\partial d_1} & \Lambda & \frac{\partial C_p(\xi_1)}{\partial d_n} \\ \frac{\partial C_p(\xi_2)}{\partial d_0} & \frac{\partial C_p(\xi_2)}{\partial d_1} & \Lambda & \frac{\partial C_p(\xi_2)}{\partial d_n} \\ M & M & M & M \\ \frac{\partial C_p(\xi_m)}{\partial d_0} & \frac{\partial C_p(\xi_m)}{\partial d_1} & \Lambda & \frac{\partial C_p(\xi_m)}{\partial d_n} \end{bmatrix} \quad (26)$$

The dimensions of the matrix are m x n, where m is the number of CFD grid surface faces and n is the number of design variables (free Bezier coefficients). This matrix is intended to serve as a replacement for the USSAERO AIC matrix. It is significantly different from the panel-based AIC matrix in that it is not square. Lockheed's alternate aerodynamic interface converts pressure and pressure coefficient sensitivities to force component and force component sensitivities.

The existing ASTROS transformation (Harder & Demaris spline interpolation) (see Johnson, E. H. and Venkayya, V. B. "Automated Structural Optimization System (ASTROS) Volume 1, Theory Manual", AFWAL TR-88-3028, December 1988) is used to convert from structural and aerodynamic coordinate systems and vice versa. In particular, given the Euler CFD solution on the aerodynamic grid, the conversion from forces to the structural coordinate system is $$\{F\}_{s\text{-}[Gas]}\{F\}_a \quad (27)$$

where $G_{as}$ is the coordinate transformation from the aerodynamic to the structural coordinate system. Conversely, the transformation of displacements from the structural coordinate system to the aerodynamic coordinate system is $$\{\delta\}_a = \left\{\begin{matrix}\delta_x \\ \delta_y\end{matrix}\right\}_a = [G_{sa}]\{\delta\}_s \quad (28)$$

The expression for the transformation, $G_{sa}$, is given in the ASTROS Theory Manual 4 as Eqn 8.22 and the reciprocal transformation, $G_{as}$ is also defined in the manual as $G_{as} = G^t_{sa}$. Unlike the current ASTROS panel-based sensitivity, the new procedure requires actual surface coordinate displacements at the cell face centers rather than panel slopes. The final link in the new process is a matrix that converts displacements in the aerodynamic coordinate system to the changes in the Bezier coefficient design variables. For an arbitrary surface geometry, the Bezier coefficients are obtained by a least squares fit. If the displacement is expected in only the y coordinate direction ($\delta_x$=0), then only the y coordinate displacements need be computed. The least squares problem is then $$(N^TN)\{d\}=(N^T)\{y\} \quad (29)$$

where $\{d\}$ is the n dimensional vector of the $d_k$ design variables corresponding to the m dimensional vector $\{y\}$ of cell face surface coordinates. The N matrix is defined as $$N = \begin{bmatrix} B_0^N(\xi_1) & B_1^N(\xi_1) & \Lambda & B_N^N(\xi_1) \\ B_0^N(\xi_2) & B_1^N(\xi_2) & \Lambda & B_N^N(\xi_2) \\ M & M & M & M \\ B_0^N(\xi_m) & B_1^N(\xi_m) & \Lambda & B_N^N(\xi_m) \end{bmatrix} \quad (30)$$

where, the number of rows corresponds to the m grid cell face locations, $\xi_i$, and the number of columns corresponds to the number of Bezier coefficients. The $B_k^N$ are the order N Bezier polynomials.

The difference between any two shapes, as described by the two sets of surface coordinates, $y^0_m$ and $y^1_m$ is $$(N^TN)\{d^1\}-(N^TN)\{d^0\}=(N^T)\{y^1\}-(N^T)\{y^0\} \quad (31)$$

or $$\{\delta d\}=(N^TN)^{-1}N^T\{\delta y\} \quad (32)$$

Again, it is assumed that the x coordinates do not change, $\delta x$=0. The above equation provides the required link between the aerodynamic surface displacements and changes in the Bezier coefficient design variables. Changes in the pressure coefficient resulting from the structural deformation are given as $$\{\delta Cp\}_a = [AIC]\{\delta d_k\} \tag{33}$$

Lockheed's alternate aerodynamic interface converts the changes in pressure coefficient to changes in forces in the aerodynamic coordinate system and ASTROS then converts this to changes in force in the structural coordinate system using the existing ASTROS coordinate transformation (equation 27)

$$\{\delta F\}_s = [G_{as}]\{\delta F\}_a \tag{34}$$

All of the transformations happen internal to ASTROS as a one-to-one replacement for the current panel-based procedure. That is, given the basic equilibrium equation, with force components broken into rigid airloads and airloads resulting from aeroelastic deformation $$[M]\{\delta x\} + ([K] - [\delta F_a]_s)\{\delta x\}_s = \{F_a\}_s \tag{35}$$

where $\delta x = [\delta x \ \delta y]_s^T$ are displacements in the structural coordinate system and the rigid airloads and aeroelastic airloads increment are:

$$\{F_a\}_s = [G_{as}]\{F_3\}_a \tag{36}$$

$$[\delta F_a]_s = [G_{as}][AIC][N^T N]^{-1} N^T [G_{sa}] \tag{37}$$

ASTROS solves directly for the structural displacements at equilibrium, $\delta x = 0$, corresponding to rigid airloads plus the flexible force increment resulting from aeroelastic deflection given the new definitions of the AIRFRC matrix (Cp), the AIC matrix (Cp'), and the $(N^T N)^{-1} N^T$ transformation matrix (equation 32).

Sensitivity Method Validation

Figure 1:
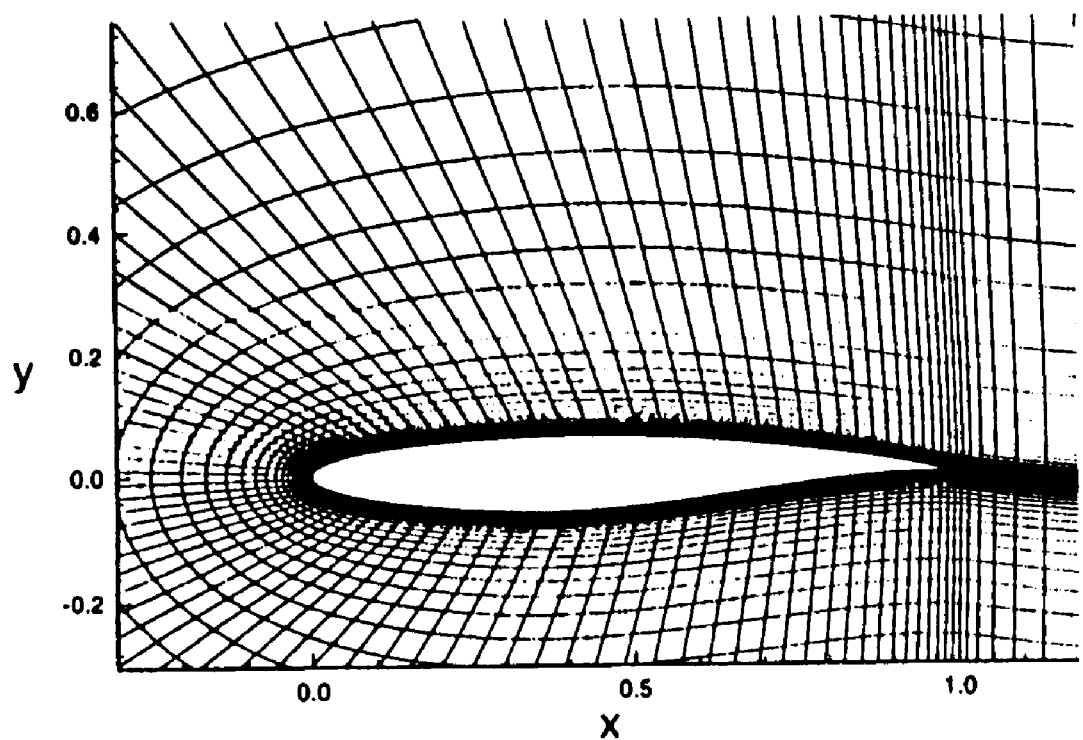
FIG. 1 is a view of the computational grid used in the demonstration of the computer based implementation of the method disclosed.

A preliminary study was made to validate the sensitivity solver prior to integrating the results into the ASTROS computer code. Results are presented for the sensitivity of the computed flow with respect to an incremental variation in angle of attack. This case is somewhat simpler than a variation with respect to geometry since there is no implicit dependence upon the design variables. The Mach 0.75 inviscid flow of the RAE 2822 airfoil at 2.72° angle of attack was considered. A relatively coarse grid (FIG. 1) extended 20 chords outward from the body and consisted of 129×41 points circumferentially and radially. Freestream boundary conditions were specified on the outer boundary of the C grid. Across the wake, continuation boundary conditions were applied and an extrapolation boundary condition was applied at the outflow. On the airfoil surface, inviscid boundary conditions were applied as outlined above. As can be seen in FIG. 5, the flow is characterized by a shock on the upper airfoil surface at about the 70% chord location.

For the sensitivity equation solution, only the outer boundary condition for the velocity components depends directly upon angle of attack. Since $$u = U_\infty \cos\alpha \ \ v = U_\infty \sin\alpha \ \ \rho = \rho_\infty \ \ p = p_\infty \tag{38}$$

it follows that $$u' = -U_\infty \sin\alpha \ \ v' = U_\infty \cos\alpha \ \ \rho' = 0 \ \ p' = 0 \tag{39}$$

This boundary condition provides the initial condition for the sensitivity flow state as well. The remaining sensitivity equation boundary conditions are obtained by differentiating the flow state boundary conditions with respect to angle of attack. Since there is no direct functional dependence upon angle of attack, the boundary conditions for the sensitivities are identical to those for the flow state.

In order to assess the accuracy of the sensitivity solutions, finite difference approximations for angle of attack sensitivity were computed for two different angle-of-attack step sizes $\Delta\alpha = 0.050$ and $\Delta\alpha = 0.1°$ using the standard central difference approximation $$\frac{\delta q}{\delta \alpha} = \frac{q_{\alpha+\Delta\alpha} - q_{\alpha-\Delta\alpha}}{2\Delta\alpha} - \frac{(\Delta\alpha)^2}{6} q_a^m + HOTs \tag{40}$$

Difficulties inherent in this traditional method of assessing sensitivities are largely responsible for the development of partial differential equation (PDE) based sensitivity methods. For example, if the more accurate central difference approximation is used, then the method requires two flow state solves for the computation of each sensitivity. The biggest drawback, however, is the critical dependence of the sensitivities upon the step size of the design variable. If chosen too small, then round-off errors may predominate. If the step is chosen too large, truncation errors become unacceptably large. For example, the larger step size, $\Delta\alpha = 0.1°$ was found to produce very poor agreement with both the smaller step size and the sensitivity equation solutions.

FIG. 2 presents a comparison of the finite difference and sensitivity equation predictions for the pressure sensitivity of the flow primitive variables in response to an infinitesimal change in angle of attack (similar results were obtained for $\rho', u', v'$). The agreement was quite good between the smaller finite difference step size $\Delta\alpha = 0.05°$ and the analytical sensitivity equation predictions. Both show that the largest change is a slight displacement of the shock downstream. Compared to their initial values, the region immediately upstream of the shock experiences large negative changes in the density and pressure and the region downstream of the shock experiences corresponding positive changes in response to a somewhat stronger shock.

Sensitivity Solutions for Shape Deformation

The RAE 2822 airfoil surface was defined in terms of a single 17th order Bezier polynomial. The order of the polynomial was somewhat arbitrary. No attempt was made to find the minimum degree polynomial necessary to adequately represent the surface geometry. Referring to equation 24, there were 18 Bezier coefficients but only 17 free coefficients since the first and last coefficients identically correspond to the same trailing edge point. For illustrative purposes, the effect of an arbitrary+0.05 increment in each of the Bezier coefficients on the surface geometry is shown in FIG. 3.

Flow solutions and corresponding sensitivity solutions were obtained for two flight conditions, a subsonic Mach 0.5 case and a transonic Mach 0.75, both for an angle of attack of 2.72°. FIGS. 4 and 5 shows the resulting pressure field and pressure coefficients for the subsonic and transonic simulation conditions respectively. At the subsonic Mach number, the flow is characterized by a rapid expansion at the leading edge and an immediate recompression downstream of the leading edge producing a lift component of 0.6289. At the higher Mach number, the suction peak prevailed over most of the upper surface until terminated by the shock. This flow behavior, characteristic of supercritical airfoils, resulted in a significantly higher lift coefficient of 0.9475.

Figure 7B:
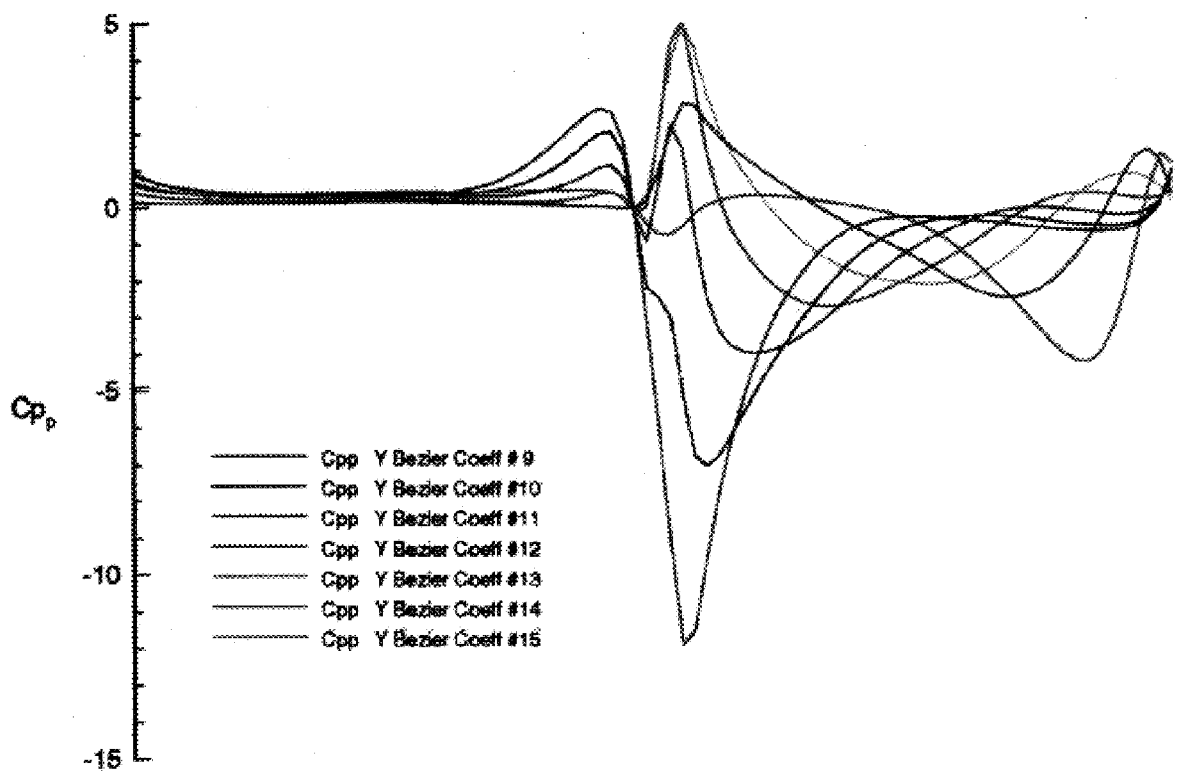
FIG. 7 shows the sensitivity of the pressure coefficient with respect to select infinitesimal deformations of the structure in the sample problem solved with a free stream Mach number of 0.5.

Sensitivity solutions were obtained for an incremental variation with respect to each of the 17 free y component Bezier coefficients. FIG. 6 shows the pressure sensitivity field with respect to a variation of the 2nd, 6th, 10th, and 14th y coordinate Bezier coefficients. As can be seen from FIG. 6, the influence of a particular coefficients was most pronounced in the local area where the geometry was most strongly influenced by the coefficient. FIG. 7 plots the pressure coefficient sensitivity (Equation 25) for a variation with respect to each of the seventeen Bezier coefficients. Other than the previously discussed local effect, all of pressure coefficient sensitivities exhibit large changes in leading edge region. The 0th coefficient corresponding to a change in the 0th and 17th coefficients (the lower and upper surface trailing edge points) shows the highest level of sensitivity. There is some redundancy in the coefficients. For example, if all y coordinate displacements are scaled by a uniform translation corresponding to a trailing edge displacement of zero, the geometry is unchanged. Numerical experiments have shown that the 0th and 17th coefficients are then zero and all other Bezier coefficients are shifted up or down proportionately. In this case, the 0th sensitivity solution has no effect upon the solution. However, either translating or not translating to the zero trailing edge state resulted in identical solutions for the pressure coefficient sensitivities for an arbitrary shape deformation.

Figure 9A:
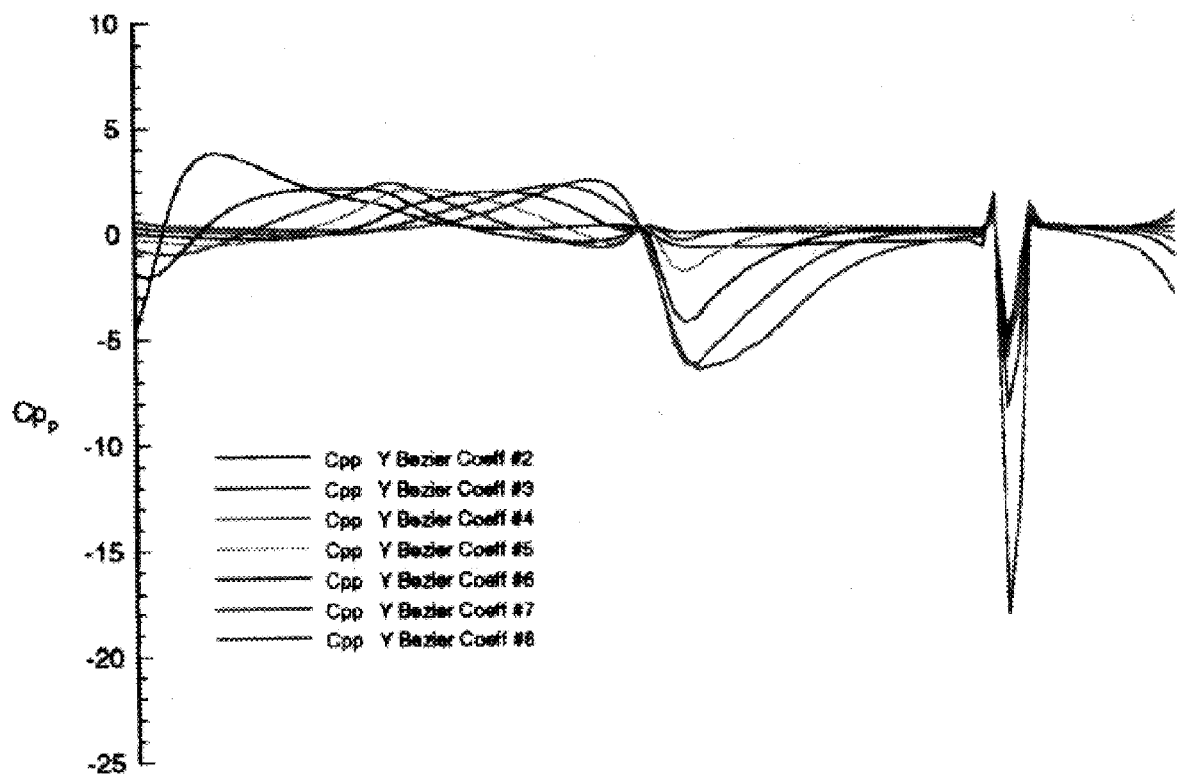
FIG. 9 shows the sensitivity of the pressure coefficient with respect to select infinitesimal deformations of the structure in the sample problem solved with a free stream Mach number of 0.75.
Figure 9B:
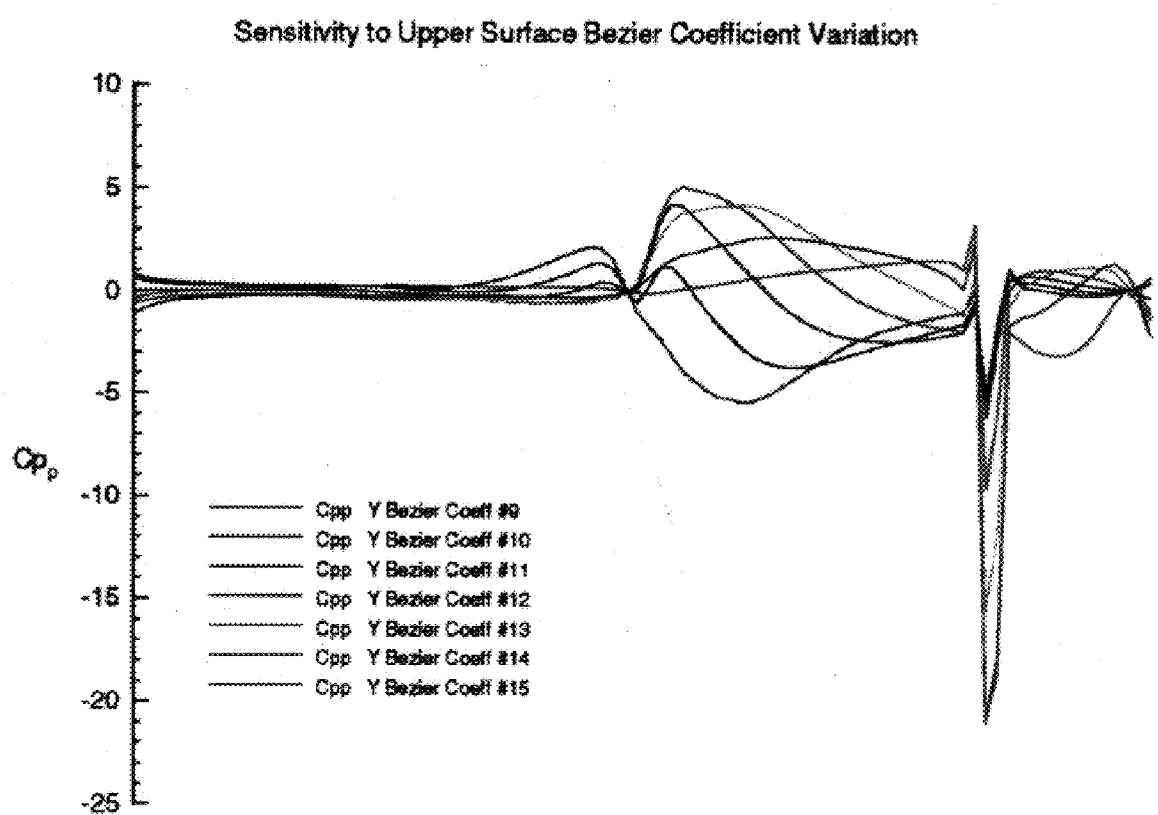
Figure 9C:
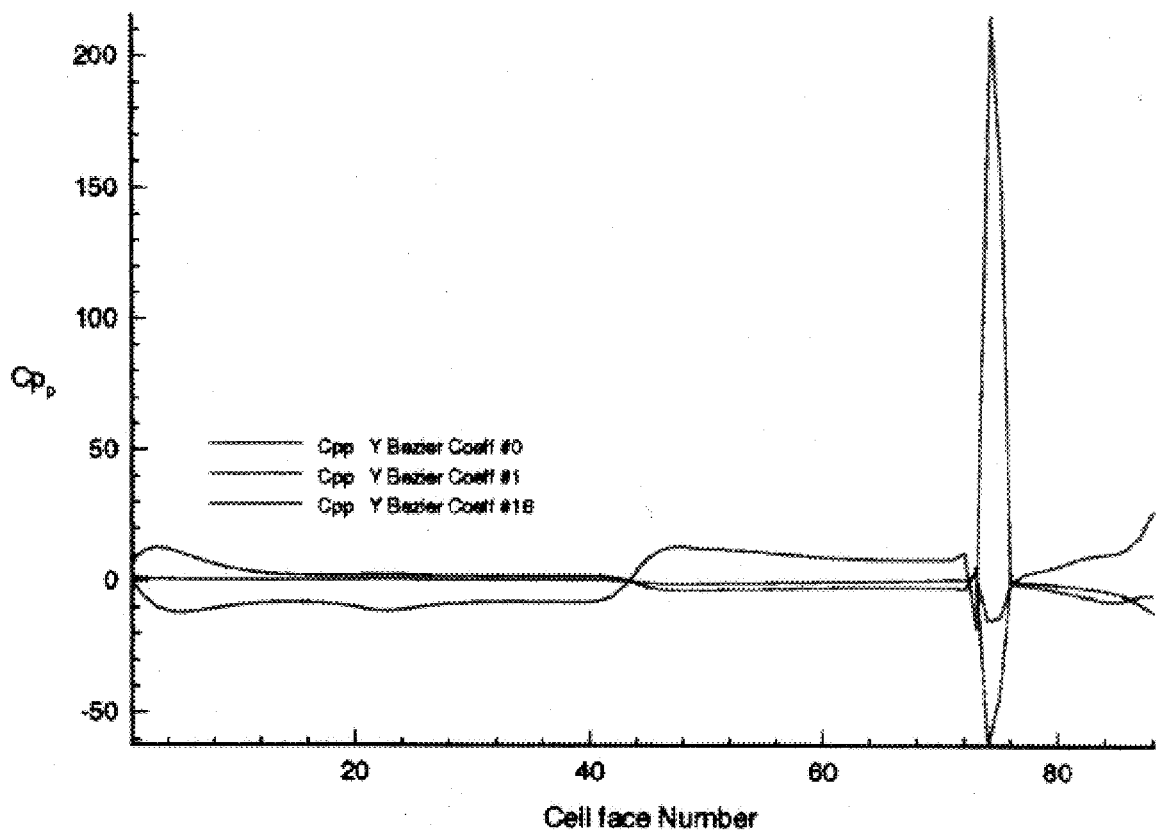

FIGS. 8 and 9 show the pressure field sensitivity and surface pressure coefficient sensitivity for the Mach 0.75 case. Unlike the lower Mach number case, the sensitivity at the leading edge is much smaller in magnitude. The shock location, however, displays very large changes in the pressure and pressure coefficient sensitivities. Both reflect the sensitivity of the shock location and shock strength to small changes in surface geometry.

An additional validation test was performed to verify the accuracy of the sensitivity equation solver for geometry variation and the conversion of arbitrary y coordinate displacements to Bezier coefficient changes (Equation 32), and the subsequent conversion to pressure coefficient sensitivities (Equation 33). FIGS. 9 and 10 plot the change in pressure coefficient, $\Delta Cp$, corresponding to a change in angle of attack (2.72°±0.05°) as predicted by flow solver. The abscissa begins at the lower surface trailing edge and runs circumferentially around the wing section to the upper surface trailing edge. Also plotted on FIGS. 10 and 11 are the $\Delta Cp$'s predicted by equations 32 and 33 for a displacement of the y coordinates corresponding to a 0.05° pitch up or pitch down about the 30% chord location. In both FIGS. 10 and 11, the agreement is quite good. The sensitivity prediction shows an apparent tendency to somewhat over predict the change in the extremely high gradient regions at the subsonic leading edge and in the transonic shock region.

All flow solutions and sensitivity equation solutions presented in this report were obtained with a second order, fully upwind-biased flux interpolation (k=−1, equation 11). Efforts to extend the flux interpolations to third order (k=⅓, equation 11) and then impose a limiter in the high gradient regions generally proved unsatisfactory. It should be noted, as well, that the inclusion of derivatives implicitly linked through the y boundary in the surface boundary condition, for example, the term, $$\frac{\partial u_w}{\partial y}\frac{\partial y}{\partial d_k},$$

in Equation 21, tended to increase the magnitude of the sensitivity gradients and produced numerical oscillations in regions of rapid change. For that reason, these terms were dropped from the surface boundary conditions, equations 21–23.

There is an additional subtlety in the ASTROS implementation of Equations 32 and 33 that requires explanation. As defined in the current problem, there were 18 Bezier coefficients but only 17 independent coefficients (corresponding to the repeated trailing edge coefficient). In Equation 32, the transformation was constructed by varying the standard deviation of the trailing edge points such that: given any set of $\delta y$'s with the first and last points equal, the transformation returned a set of $\delta d_k$'s with the first and last coefficients also identical. The AIC matrix consisted of only 17 columns corresponding to the 17 free Bezier coefficients (since the effect of the identical 0th and 17th terms was accounted for in the 0th sensitivity solution). To reduce the entire process to a simple matrix multiplication, as required by ASTROS, the AIC matrix was padded with a column of zeros in the 18th column.

ASTROS Structural Model

A structural model corresponds to the RAE 2822 wing section. The chord was 100 inches and the span was arbitrarily set as 5. FIG. 12 shows the structural model consisting of QUAD4, SHEAR, TRIA3, and ROD elements. FIG. 13 presents a wire-frame view of the structural and the aerodynamic models. The aerodynamic model, corresponding to the CFD grid, was significantly more refined than the structural model. The interpolation between forces and displacements at known points in the aerodynamic grid (cell face centroids) and the corresponding points in the structural domain (individual structural elements) was accomplished through the existing ASTROS (Harder & Demaris) spline interpolation technique.

Integration with ASTROS

The Euler-based load and load sensitivity model was developed as a complete replacement for the existing USSAERO panel model. The model was incorporated in ASTROS using Lockheed's alternate aerodynamic interface. The alternate interface required rigid body aerodynamic pressure coefficients (the AIRFRC matrix) and pressure coefficient sensitivities (the AIC matrix) corresponding to surface displacement as a result of applied loads. The new procedure provided the required information through alternate definitions of the AIRFRC matrix (Cp), the AIC matrix (Cp'), and the $(N^T N)^{-1} N^T$ transformation matrix.

Static aeroelastic solutions were generated at Mach 0.5 and 0.75 flight conditions for sea level static conditions. For the material properties selected, the two dimensional model shows very little deformation and a very small flexibile to rigid force increment. To better demonstrate the integration of the force sensitivity analysis, the structural model was modified to include a torsion spring at the mount point (30% chord). Since the aerodynamic center of pressure was at 38% chord, the rigid airload produced a nose-down pitching moment. The resulting force sensitivities then acted upon a shape change due largely to rotation rather than deformation. The net effect was to decrease the force generated at the aerodynamic center and hence decrease the nose-down deflection (aeroelastic relief effect). This simple two dimensional problem thoroughly exercised the new aerodynamic model and its integration in ASTROS. It further provided a realistic approximation to the torsional effects of the outboard sections of a three dimensional wing. The spring torsion constant, $K_\theta$, was adjusted to provide deflections within which the linear AIC matrix was expected to provide reasonable answers.

Table 1 summarizes the ASTROS runs with the new aerodynamic model. FIGS. 14–18 and 91-23 graphically display the ASTROS output for the Mach 0.5, $K_\theta=0.5\times10^6$ and Mach 0.75, $K_\theta=7.5\times10^6$ cases respectively. Results for both subsonic and transonic conditions show the expected aeroelastic relief effect. In accord with FIGS. 10 and 11, the pressure coefficient sensitivity was most pronounced at the leading edge for the lower Mach number and at the shock location for the higher Mach number. The tabular results highlight a potential problem with the ASTROS code in dealing with realistic wing geometries (as opposed to the zero thickness USSAERO panel representation). The $C_y$-Rigid column is the normal force coefficient as computed in the aerodynamic coordinate system. The $C_y$-Splined column is the same normal force now interpolated to the structural coordinate system through the Harder-Demaris spline. The aerodynamic force coefficient agrees with results independently computed within the CFD code. Additional force is generated, however, through the interpolation procedure. It is expected that the force coefficient sensitivities are also subject to the same interpolation errors as the force coefficients. Overall, the inaccuracies in the spline interpolation are on the same order as the aeroelastic force increment.

TABLE I

Summary of Normal Force Coefficients
for ASTROS with Euler-Based Aerodynamic Model

| Mach No | $K_\theta$(in-lb/rad) | $C_y$-Rigid | $C_y$-Splined | $C_y$-Flex | $C_y$-Flex/Rigid |
|---|---|---|---|---|---|
| 0.5 | $0.5 \times 10^6$ | 0.62898 | 0.64973 | 0.61133 | 0.9409 |
| 0.75 | $3.0 \times 10^6$ | 0.94747 | 0.96402 | 0.93634 | 0.9713 |
| 0.75 | $7.5 \times 10^6$ | 0.94747 | 0.96402 | 0.94852 | 0.9839 |

Calculation of Sensitivity by Means of Finite Differences

Note that one may obtain the sensitivity of the flow field by a method that would compute the flow solutions for two closely spaced values of the parameter for which the sensitivity is desired, subtract the two fields and divide by the increment in the parameter. This method for the calculation of sensitivity is not as robust or efficient as the method described above. However, if one does compute a valid sensitivity in this manner, the above method for assembling the $\delta F_a$, matrix and introducing it into the finite element calculation may be used.

What is claimed is:

1. A method of predicting change in the shape of a solid structure upon which a fluid exerts a force, comprising the steps of:

a) selecting a solid structure;

b) selecting a geometric parameterization for the deformations of the structure;

c) selecting equations constituting a fluid model representing the flow of fluid;

d) calculating a flow solution for the structure without deformation, using a computational fluid dynamics solver;

e) calculating the flow sensitivity with respect to the geometric parameters;

f) setting up a finite element mesh representing the solid structure;

g) interpolating the flow and sensitivity solutions onto the finite element mesh;

h) computing a stiffness matrix from the finite element mesh;

i) modifying the structural stiffness matrix to account for the flexibility of the structure;

j) solving for structural displacements, k) modifying the design of the solid structure in accordance with the solution.

2. The method of claim 1, further comprising the step of repeating the method from step (b) using the modified design from step k of claim 1.

3. The method of claim 1 that computes the stiffness matrix by solving the sensitivity equation with boundary conditions appropriate to the possible geometric deformations of the structure.

4. The method of claim 3 where the boundary conditions are represented by a family of polynomials.

5. The method of claim 4, in which the family of polynomials are Bezier polynomials.

6. The method of claim 4, in which the family of polynomials are splines.

7. The method of claim 5, in which the family of polynomials are non-uniform rational B-splines.

8. The method of claim 4 where the boundary conditions for the sensitivity equations are derived from the polynomial representation.

9. The method of claim 3 where the boundary deformations are represented by deformation eigenfunctions of the structure.

10. The method of claim 9 where the boundary conditions for the sensitivity equations are derived from the eigenfunctions.

11. The method of claim 1 in which the stiffness matrix is computed by solving for the sensitivities by means of finite differences of flow fields.

12. The method of claim 1 in which the solid structure is an airfoil.

13. The method of claim 1 in which the computational fluid dynamics solver used for the flow solution of step (d) is a finite volume, upwind biased flow method.

14. The method of claim 13, in which the method of the computational fluid dynamics solver uses Roe's approximate Riemann solver.

15. The method of claim 1, in which the flow sensitivity calculated in step (e) is calculated by the steps of:
   a) computing the flow solutions for two closely spaced values of the parameter for which the sensitivity is desired,
   b) subtracting the two fields, and
   c) dividing by the increment in the parameter.

16. The method of claim 1, in which equations constituting the fluid model are non-linear.

17. The method of claim 16, in which the equations are Navier-Stokes equations.

18. The method of claim 16, in which the equations are Euler equations.

* * * * *